Figure 1:
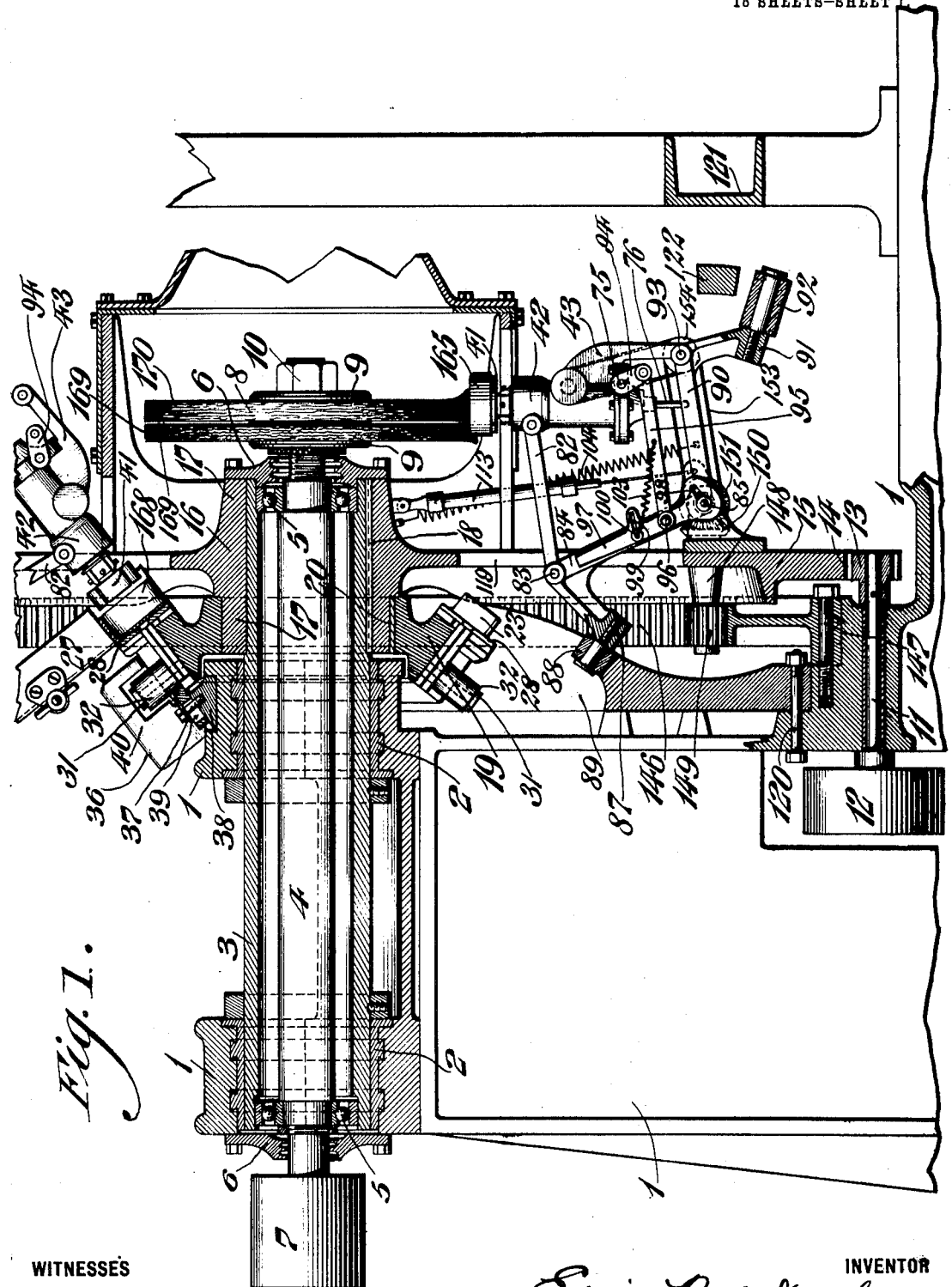

E. R. DOUGLAS.
BUFFING MACHINE.
APPLICATION FILED JULY 21, 1911.

1,022,128. Patented Apr. 2, 1912.
18 SHEETS—SHEET 1.

WITNESSES
L. Couville,
P. F. Nagle.

INVENTOR
Edwin Rust Douglas.
BY Wiedersheim & Fairbanks
ATTORNEYS

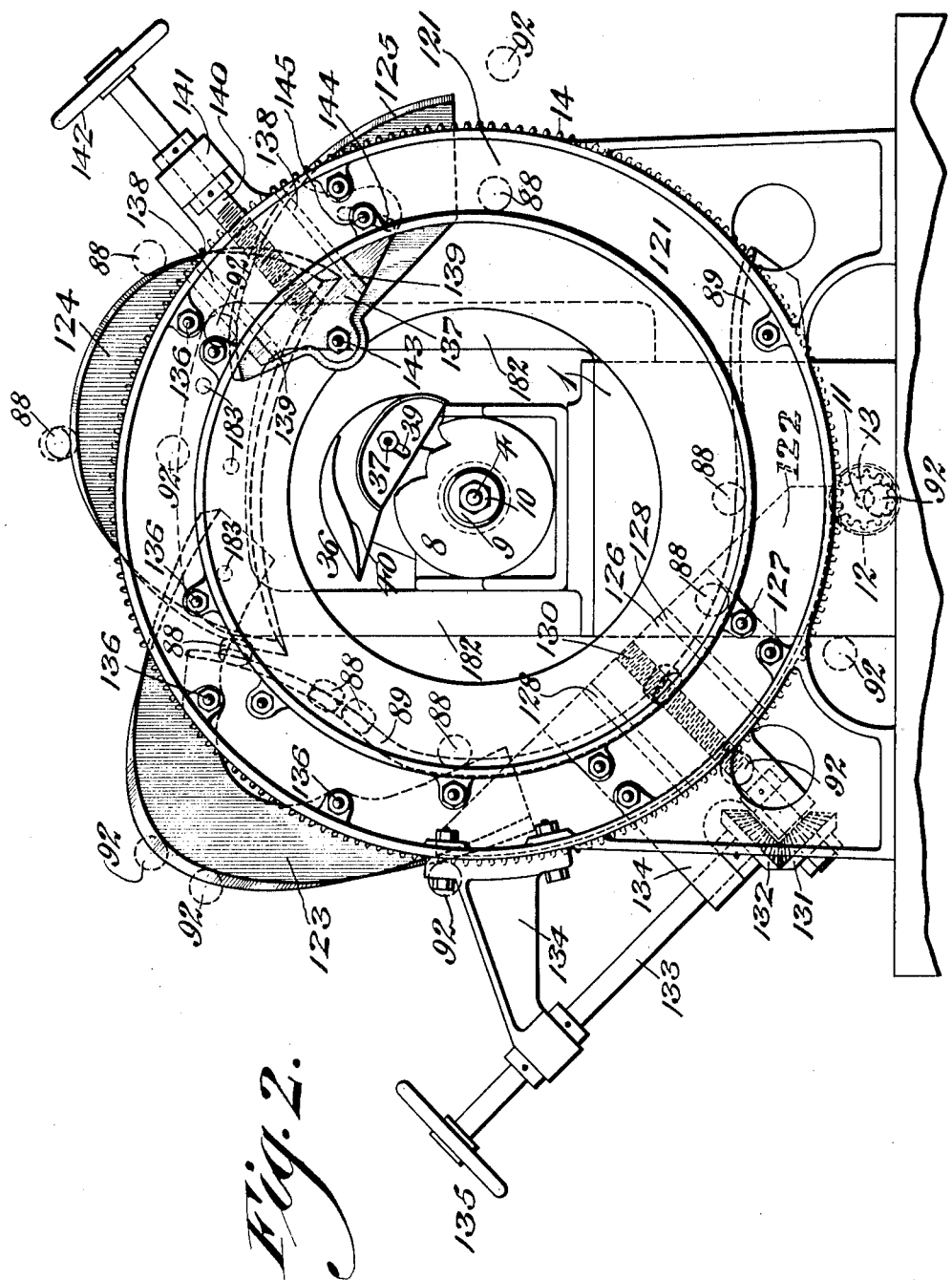

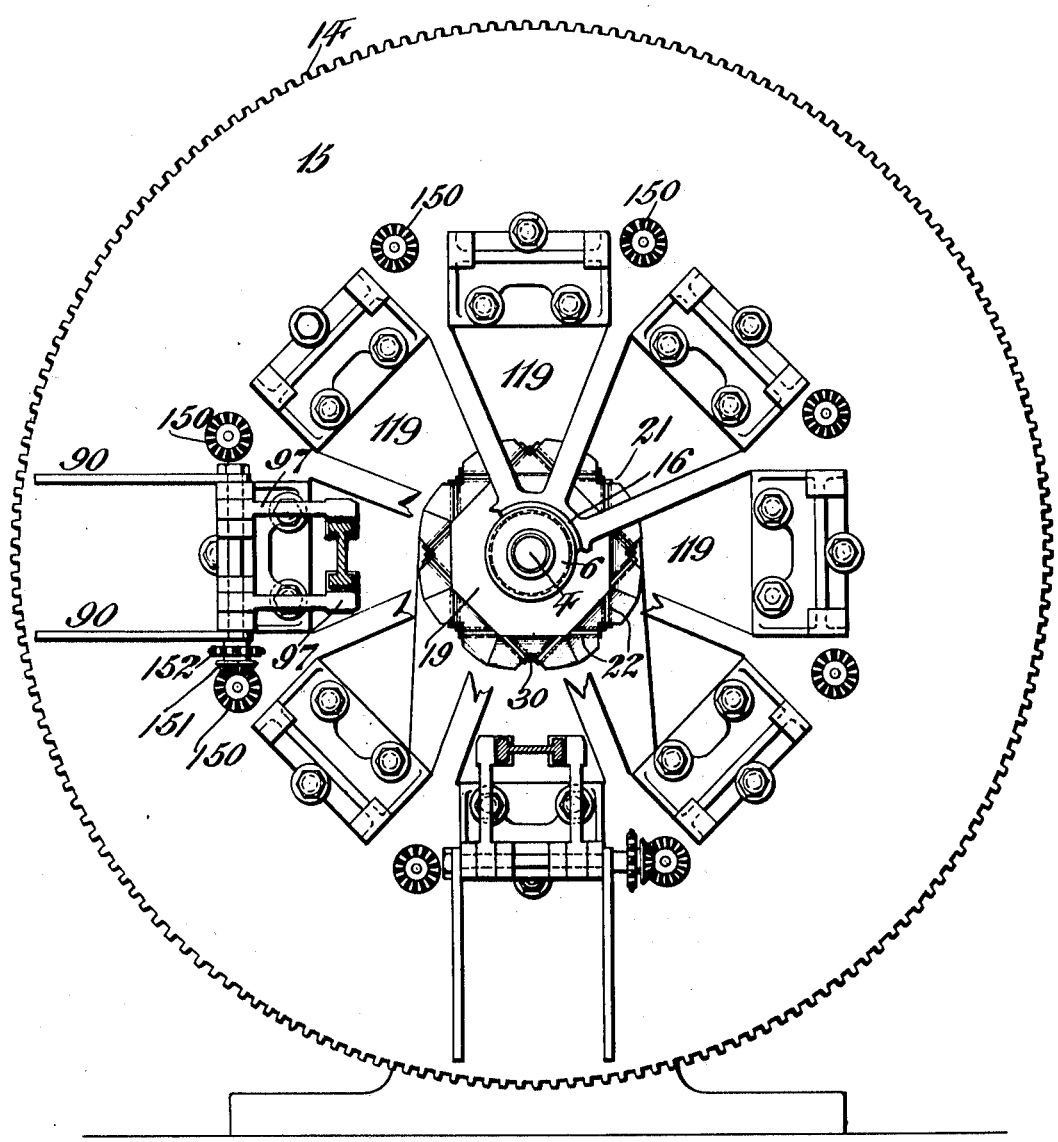

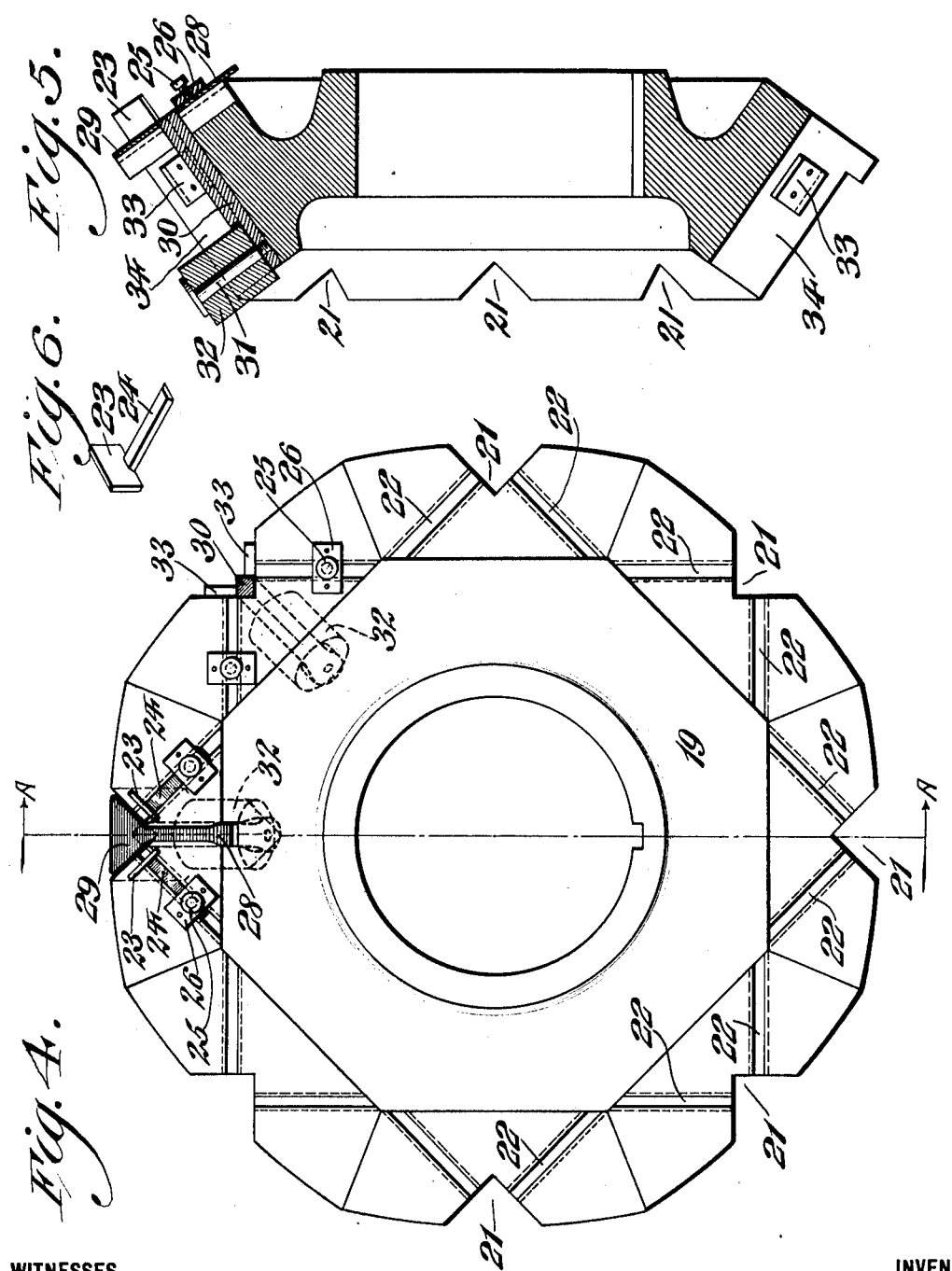

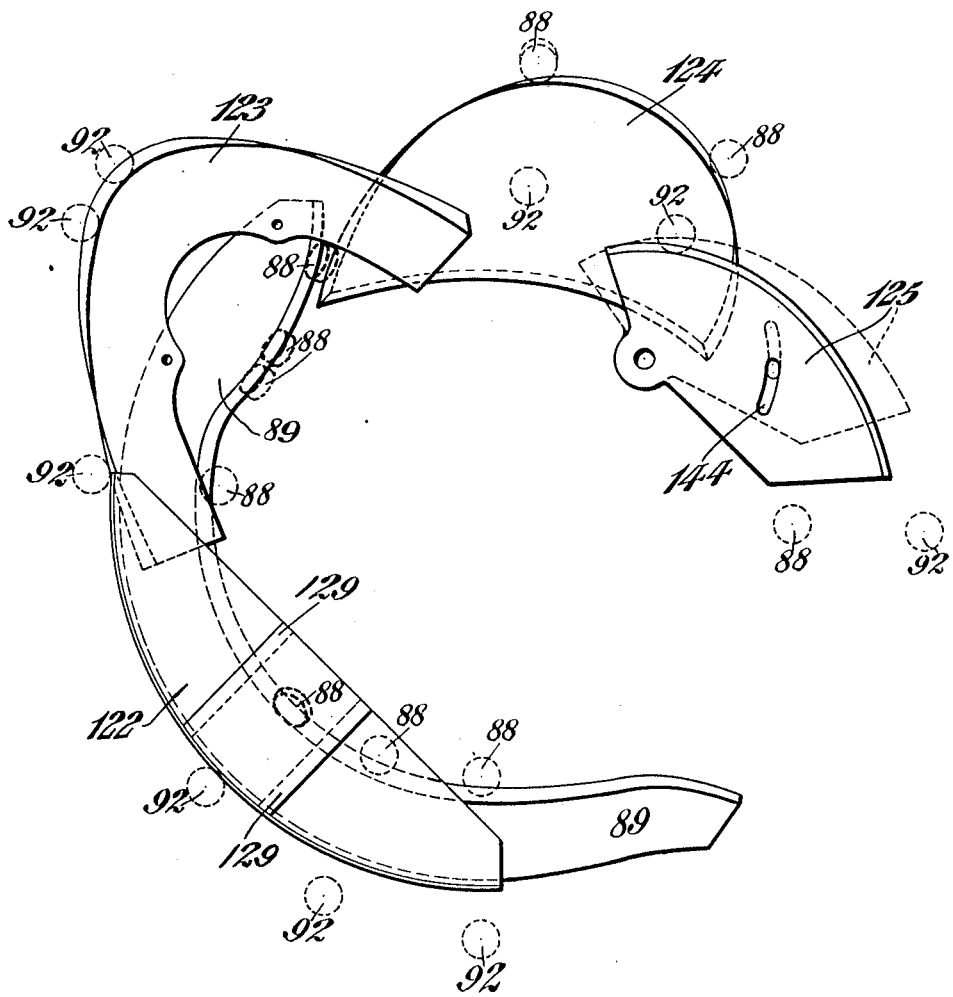

E. R. DOUGLAS.
BUFFING MACHINE.
APPLICATION FILED JULY 21, 1911.
1,022,128.
Patented Apr. 2, 1912.
18 SHEETS—SHEET 6.
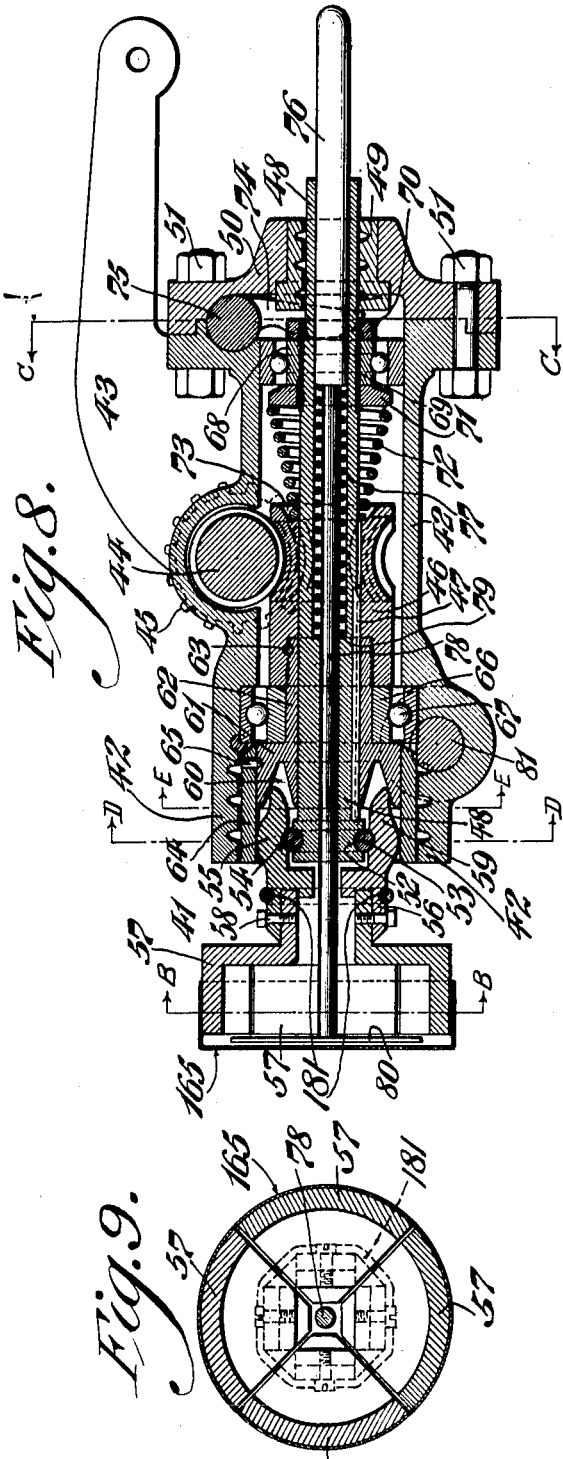
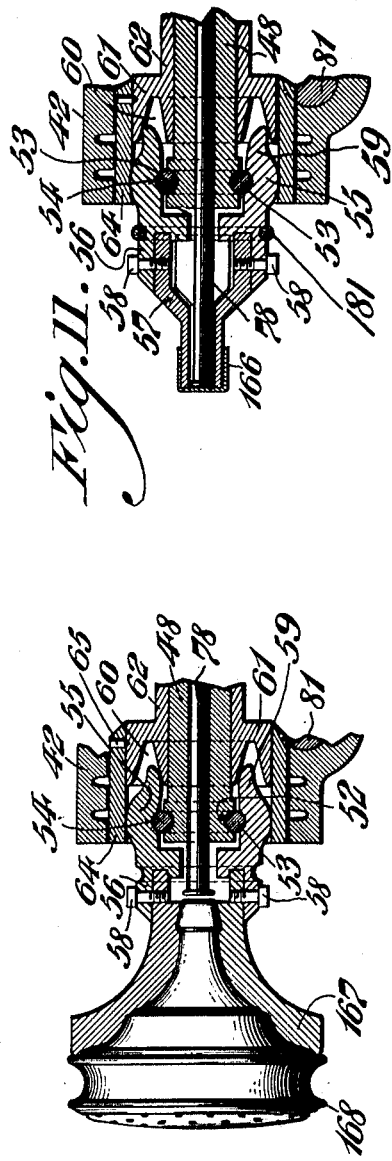
WITNESSES
L. Couville
P. F. Nagle
INVENTOR
Edwin Rust Douglas.
BY Niedersheim & Fairbanks.
ATTORNEYS E. R. DOUGLAS.
BUFFING MACHINE.
APPLICATION FILED JULY 21, 1911.
1,022,128.
Patented Apr. 2, 1912.
18 SHEETS—SHEET 7.
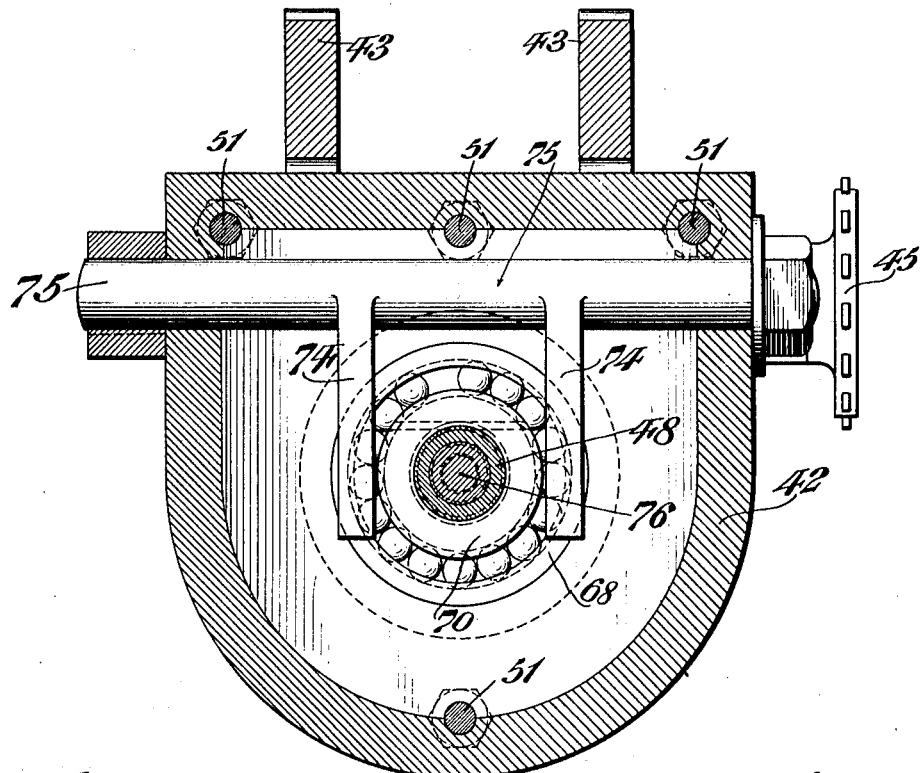
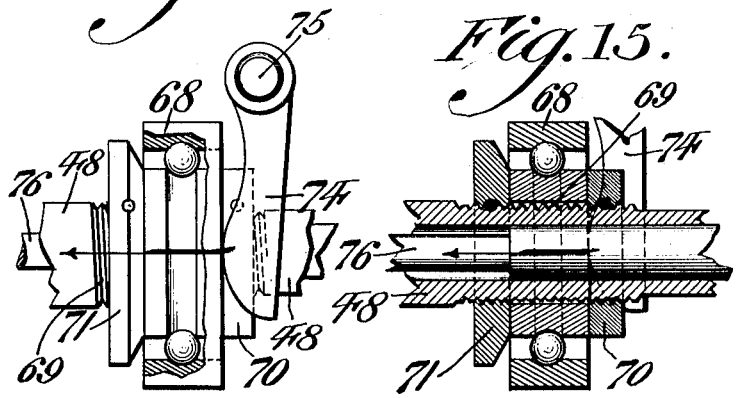
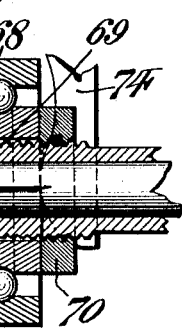
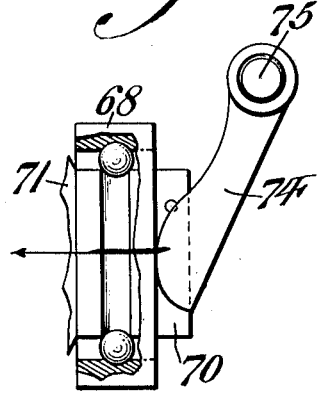
WITNESSES
INVENTOR
Edwin Rust Douglas.
BY
ATTORNEYS

E. R. DOUGLAS.
BUFFING MACHINE.
APPLICATION FILED JULY 21, 1911.

1,022,128.

Patented Apr. 2, 1912.
18 SHEETS—SHEET 8.

WITNESSES
L. Douville,
P. F. Nagle.

INVENTOR
Edwin Rust Douglas.
BY Niederschein Fairbanks
ATTORNEYS

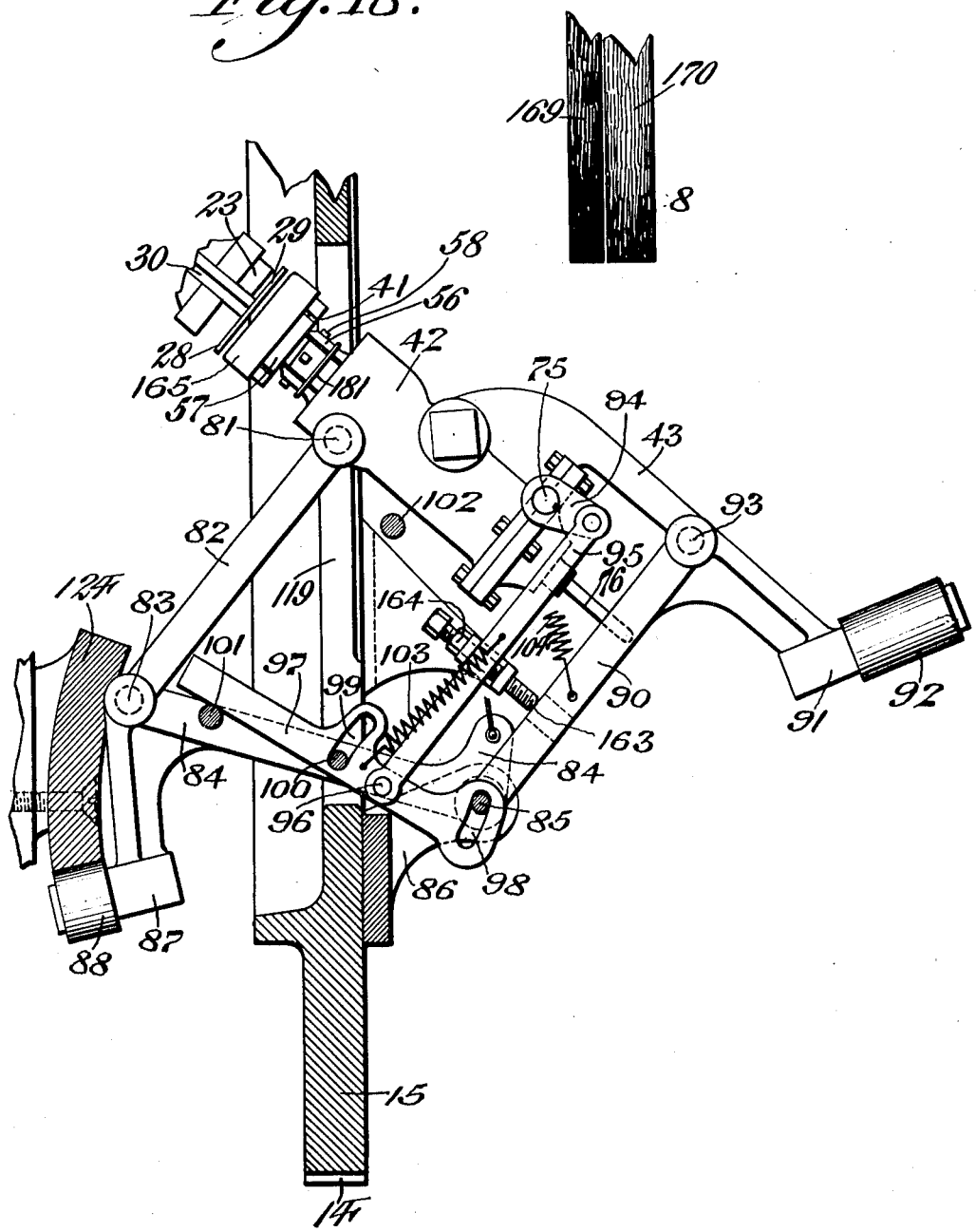

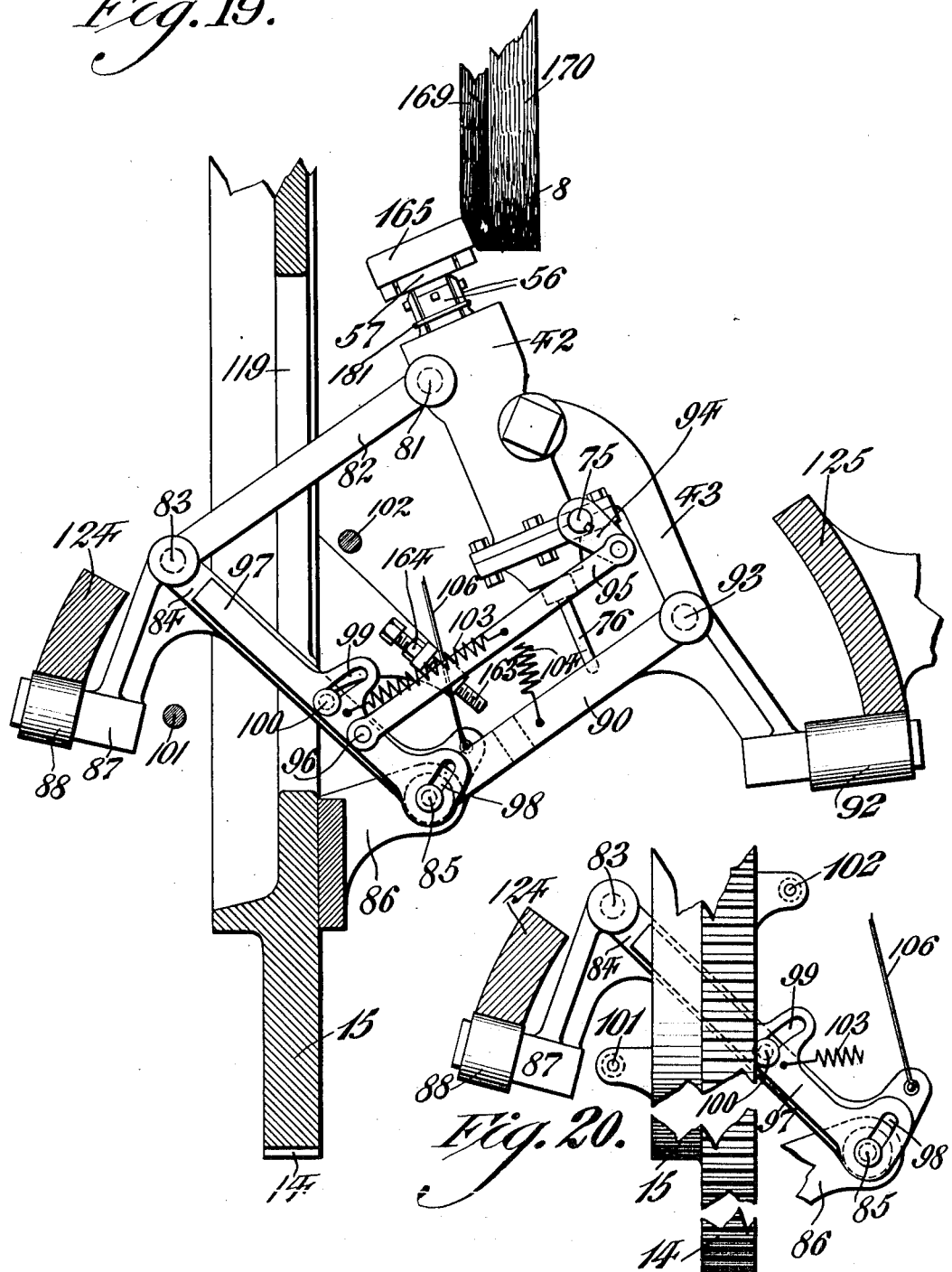

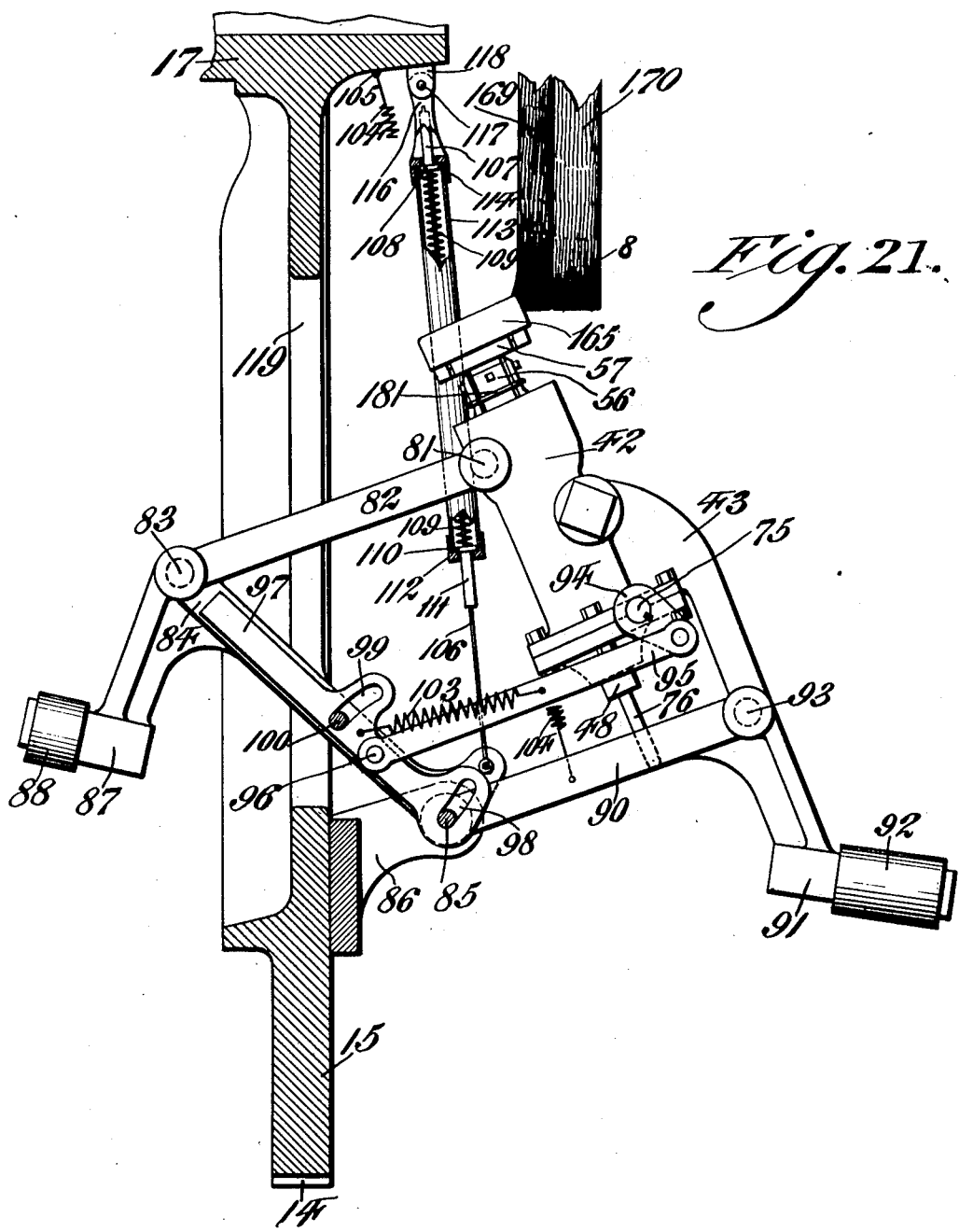

E. R. DOUGLAS.
BUFFING MACHINE.
APPLICATION FILED JULY 21, 1911.

1,022,128.

Patented Apr. 2, 1912.
18 SHEETS—SHEET 12.

WITNESSES
L. Couville,
P. F. Nagle.

INVENTOR
Edwin Rust Douglas.
BY Wiedersheim Fairbanks.
ATTORNEYS

E. R. DOUGLAS.
BUFFING MACHINE.
APPLICATION FILED JULY 21, 1911.

1,022,128.

Patented Apr. 2, 1912.
18 SHEETS—SHEET 14.

WITNESSES

INVENTOR

ATTORNEYS

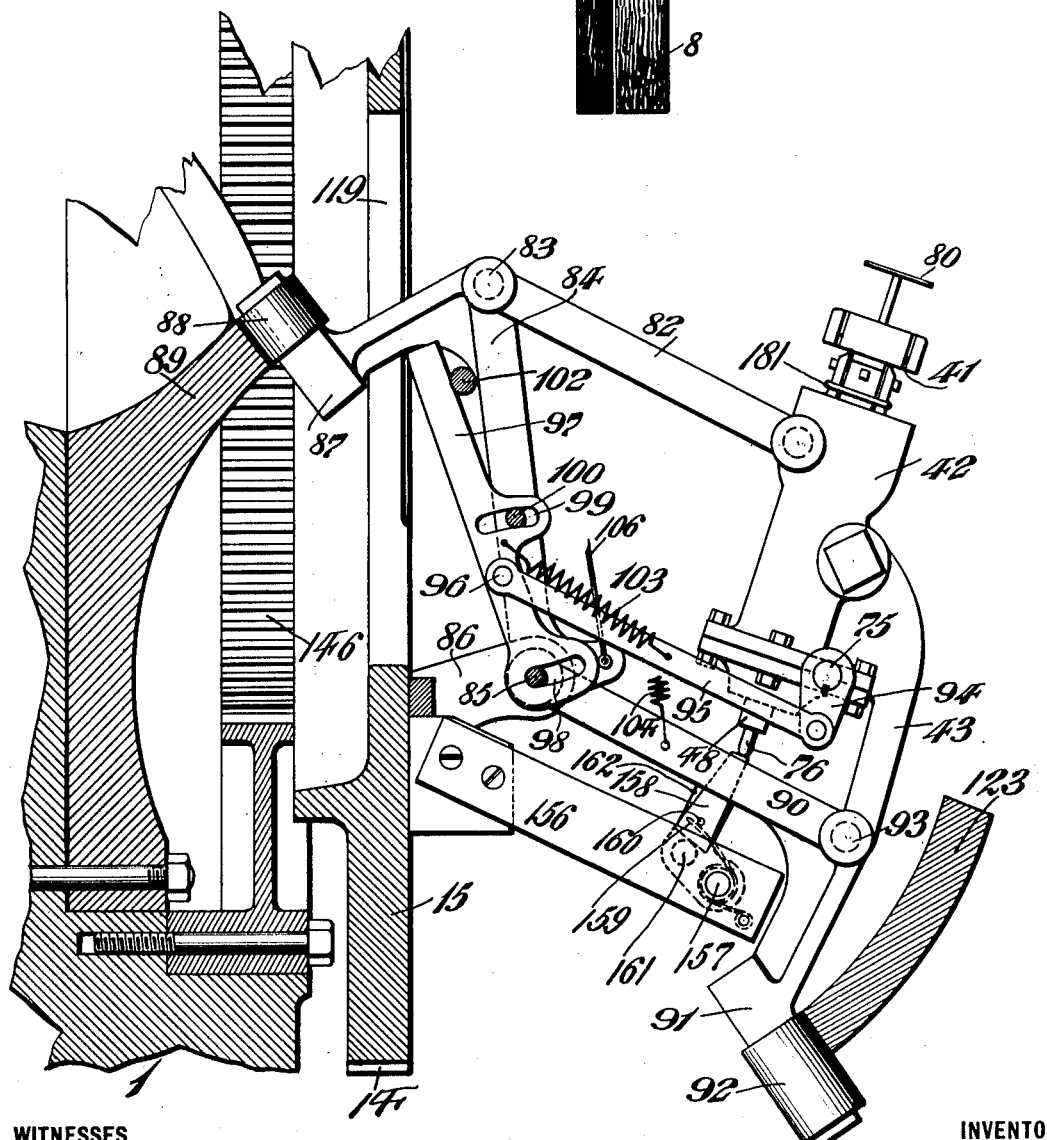

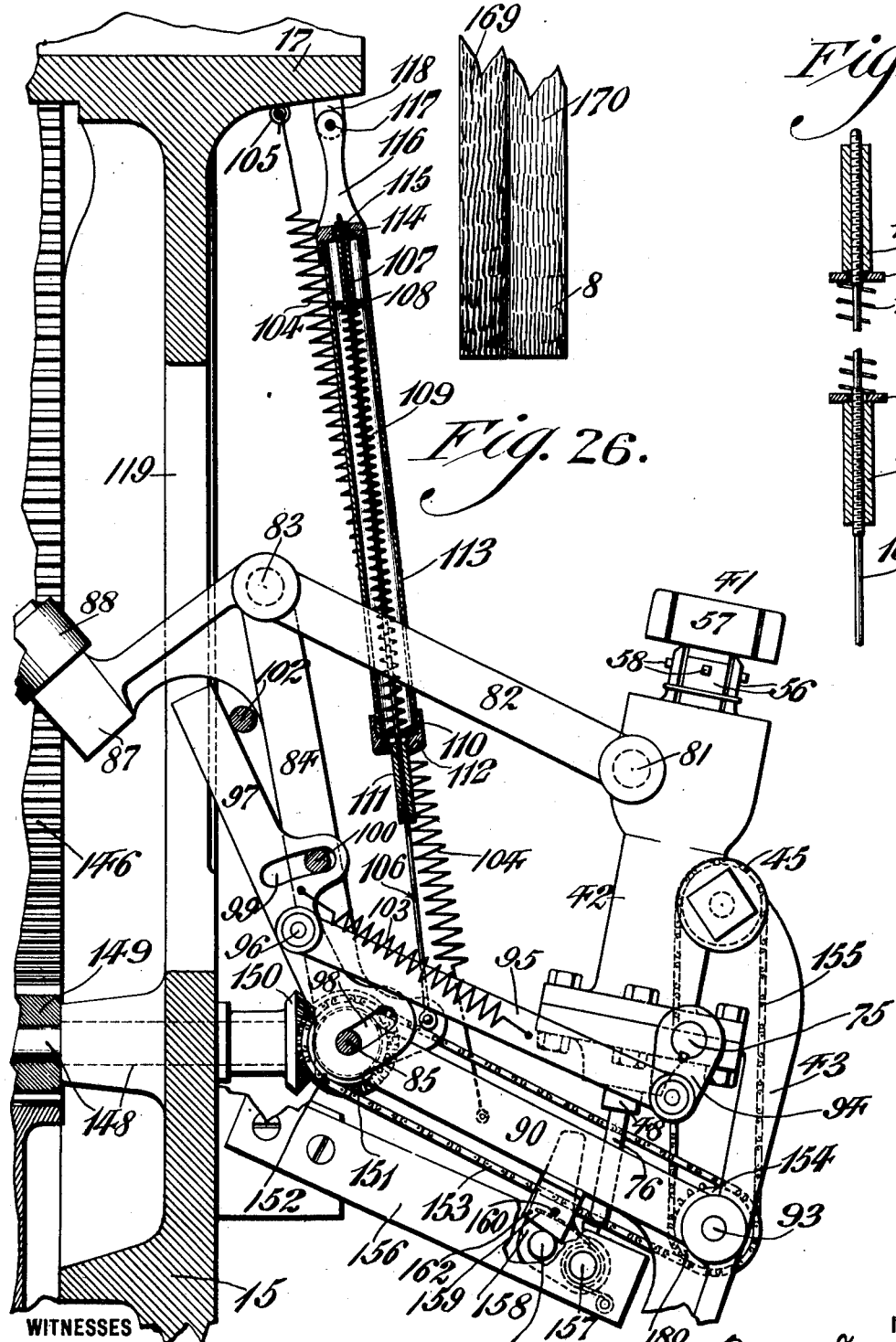

E. R. DOUGLAS.
BUFFING MACHINE.
APPLICATION FILED JULY 21, 1911.

1,022,128.

Patented Apr. 2, 1912.

18 SHEETS—SHEET 17.

WITNESSES

INVENTOR
Edwin Rust Douglas.
BY
ATTORNEYS

E. R. DOUGLAS.
BUFFING MACHINE.
APPLICATION FILED JULY 21, 1911.

1,022,128.

Patented Apr. 2, 1912.
18 SHEETS—SHEET 18.

Fig. 29.

WITNESSES
L. Douville
P. F. Nagle

INVENTOR
Edwin Rust Douglas
BY Thederoheim Fairbanks
ATTORNEYS

UNITED STATES PATENT OFFICE.

EDWIN RUST DOUGLAS, OF GLENSIDE, PENNSYLVANIA.

BUFFING-MACHINE.

1,022,128.   Specification of Letters Patent.   Patented Apr. 2, 1912.

Application filed July 21, 1911. Serial No. 639,704.

*To all whom it may concern:*

Be it known that I, EDWIN RUST DOUGLAS, a citizen of the United States, residing at Glenside, Montgomery county, State of Pennsylvania, have invented a new and useful Buffing-Machine, of which the following is a specification.

My invention consists of a novel construction of an automatic buffing machine, especially adapted for the buffing or burnishing of metal caps or the like, although it will be understood that my invention is capable of general adaptation for the grinding, polishing, burnishing or buffing of irregular or grooved, cylindrical or other surfaces generally, my aim being to provide a mechanism of this character which is wholly automatic in its action and will smooth and polish all exterior portions of the article to be finished, each portion of said article being buffed to the desired extent to produce a finished article with an outer surface of uniform smoothness and polish, means being provided for presenting the article first to the coarser portion of the abrading wheel, and provision being made for lastly presenting the article to the finer or finishing abrading wheel, all the steps in the operation from the time the articles are fed into the machine until they are ejected from the chuck supporting the same, being entirely automatic, and requiring no attention from the operator or attendant.

While I have shown my present invention as especially applicable to the automatic buffing or polishing of hollow metal caps or cylinders, which may be closed at one end, it will be apparent that the same is adapted to the treatment of any article of similar or analogous shape, such as convex heads of screws, or knobs or mounts of brass bedsteads, or any other similar article of cylindrical or other shape, which can be gripped in revolving chuck jaws, and which may have a plane, irregular, or grooved surface, which it is desired to finish by grinding, burnishing, polishing or buffing of the same.

My novel automatic apparatus results in a material reduction in the cost of grinding, burnishing, polishing or buffing, and being automatic in its action, will turn out a maximum quantity of work within a minimum length of time and is simple, cheap, reliable, and effective in its operation.

To the above ends my invention consists of a novel construction of an automatic buffing machine, wherein is employed a novel construction of a floating chuck or chucks, which are adapted to automatically engage the article to be buffed, and to automatically present the sides and top thereof to the buffing wheel, provision being made for simultaneously effecting the rotation of the chucks during their travel toward and around the buffing wheel, and means being also provided for automatically effecting the ejection of the buffed articles from their chucks, all the above steps being effected automatically, without requiring any attention on the part of the operator.

It further consists of a novel construction of a frame work carrying a main shaft having a buffing wheel thereon, a sleeve around said main shaft having a table fast thereon, and an article receiving mechanism, also movable in unison with said sleeve and table.

It further consists of a novel construction of a rotatable table, a floating chuck or chucks carried thereby, a plurality of cams and connections from said cams to said chucks for effecting the actuation of the latter.

It further consists of a novel construction of a floating chuck or chucks, means for automatically opening and closing said chucks, means for rotating said chucks and means for automatically operating the ejector device of said chucks.

It further consists of a novel construction of a rotary table, carrying a pinion, a stationary, internal gear engaging said pinion, a floating chuck carried by said table, connections from said pinion to effect the rotation of said chuck, tripping mechanism carried by said table to open and close said chuck jaws, a plurality of cams located on opposite sides of said chucks and connections from said cams to said chuck casing to effect the floating movement of the latter with respect to the buffing device.

It further consists of a novel construction of a floating chuck or chucks, a series of fixed and adjustable cams, connections common to said cams and chucks for effecting the actuation of the latter, and adjusting devices for effecting the adjustment of said adjustable cams.

It further consists of a novel construction of an article receiving mechanism, means for actuating the same, and means for effecting the adjustment of certain parts thereof.

It further consists of a novel construction of tension devices and cushioning devices for the levers and bars, connected with the chuck operating mechanism.

The invention is satisfactorily illustrated in the accompanying drawings, but the important instrumentalities thereof may be varied, and so it is to be understood that the invention is not limited to the specific arrangement and organization shown and described.

Figure 16:
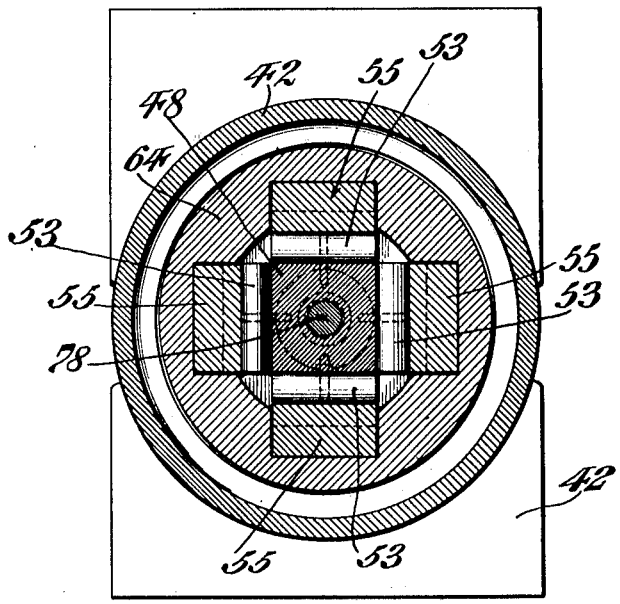
Figure 17:
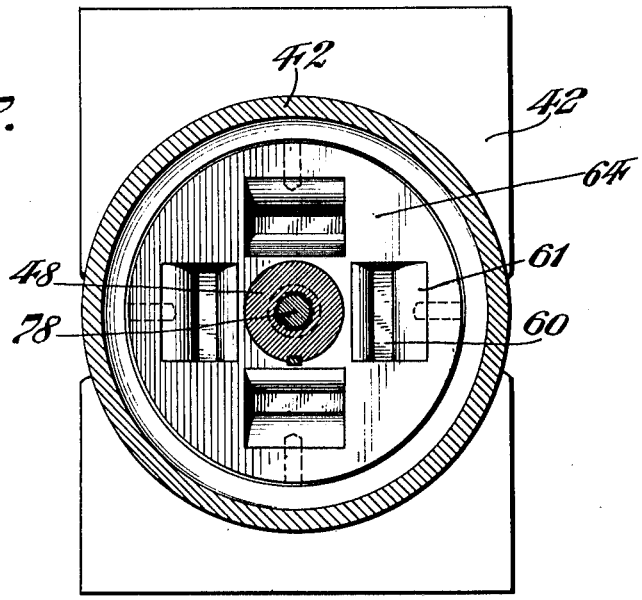
Figure 22:
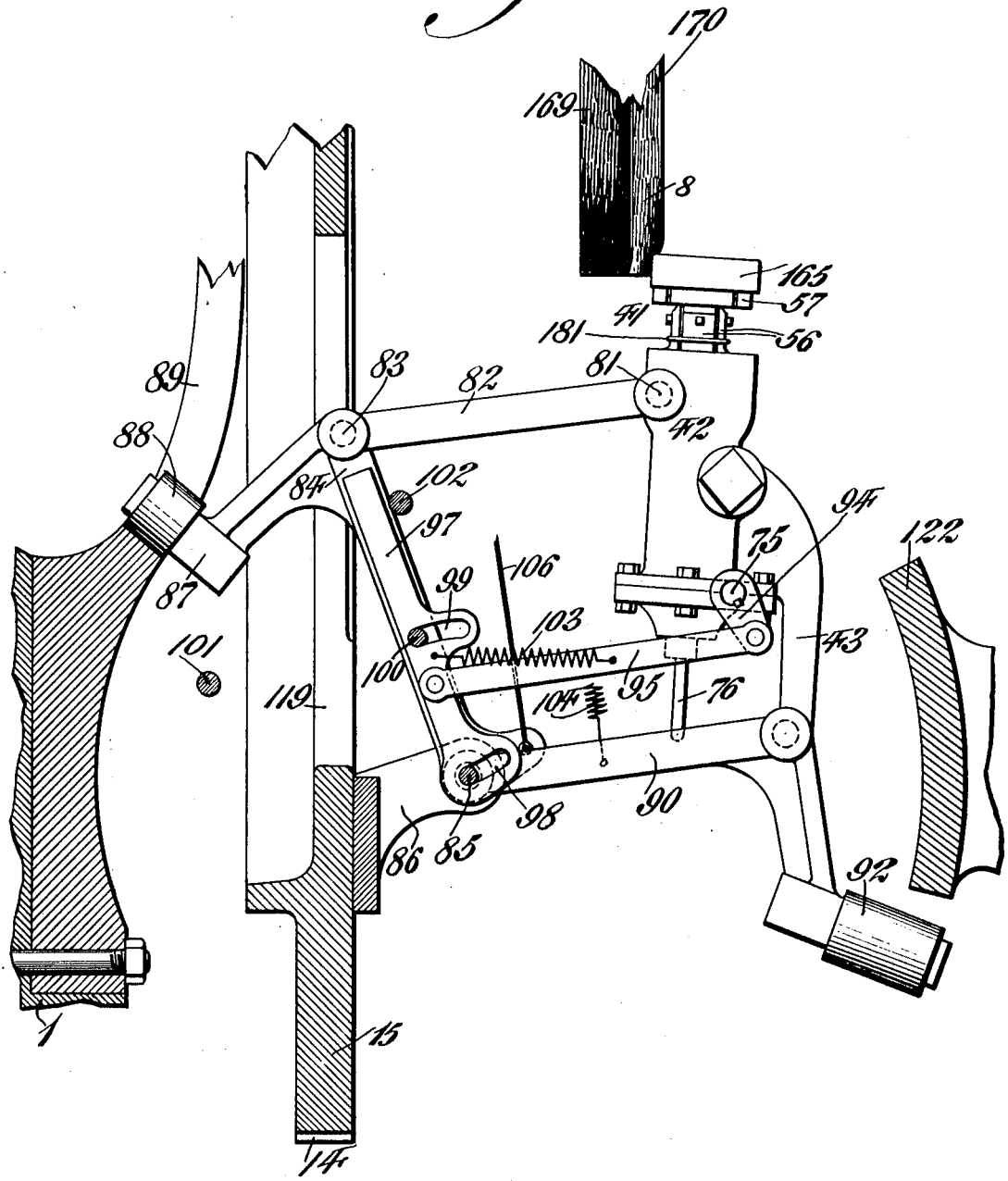
Figure 28:
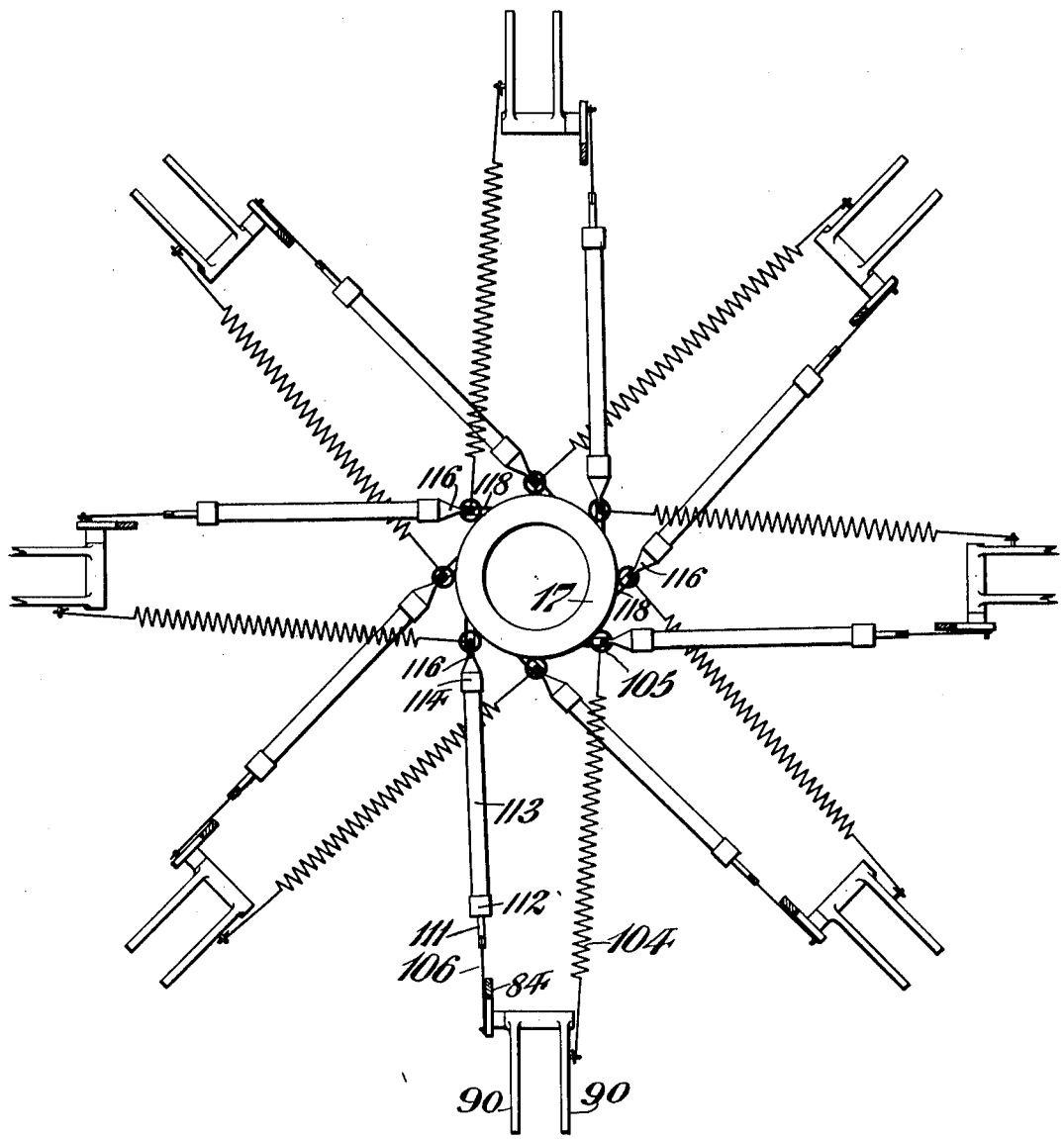

Figure 1 represents a side elevation partly in section of a buffing machine embodying my invention. Fig. 2 represents an end elevation of the same, showing particularly the relation of certain of the cams employed. Fig. 3 represents a similar view of Fig. 2, certain of the parts being removed. Fig. 4 represents a detail in elevation of the article receiving and delivering mechanism, certain parts being shown in section. Fig. 5 represents a section on line A A of Fig. 4. Fig. 6 represents a perspective view of one of the jaws of the receiving mechanism in detached position. Fig. 7 represents a detailed diagrammatic view, showing the actuating cams removed from the machine proper and positioned operatively with respect to each other. Fig. 8 represents a section of one of the chucks and its operating adjuncts. Fig. 9 represents a section on line B B of Fig. 8. Fig. 10 represents a section of one of the chucks showing the same operating to grip an article externally thereof. Fig. 11 represents a similar view showing the same as an internal chuck. Fig. 12 represents a section on line C C of Fig. 8. Figs. 13 and 14 represent details of a portion of Fig. 12 in different positions. Fig. 15 represents a vertical section of Fig. 13. Fig. 16 represents a section on line D D of Fig. 8. Fig. 17 represents a section on line E E of Fig. 8. Fig. 18 represents a side elevation of a portion of my novel machine showing one of the chucks in its initial position, and certain of the actuating elements therefor. Fig. 19 represents a similar view showing the same parts in the second position they assume during the operation of the machine. Fig. 20 represents a detail showing the trip devices employed in connection with the movement of the chuck mechanism. Fig. 21 represents a view similar to Fig. 18 showing the third position the elements assume during the operation of the machine. Fig. 22 represents a similar view showing the fifth position the parts assume during the operation of the machine. Figs. 23, 24, 25, and 26 represent respectively the sixth, seventh, eighth and ninth positions the elements assume in the operation of the machine. Fig. 27 represents in detached position a detail partly in section of one of the equalizing spring mechanisms shown in Fig. 26. Fig. 28 represents a diagrammatic arrangement of the spring mechanism controlling the several chuck mechanisms. Fig. 29 represents an end elevation of one of the chuck members and its component parts.

Similar numerals of reference indicate corresponding parts in the figures.

Referring to the drawings:—1 designates the frame or housing of a buffing machine, embodying my invention, having suitable bearings 2, in which is rotatably mounted a sleeve 3, within which rotates the main shaft 4 of the buffing mechanism, said shaft having suitable ball bearings 5, so that the sleeve 3 and shaft 4 may rotate at different speeds with respect to each other. At the ends of the frame or housing suitable cap plates 6 are provided and secure the sleeve 3 from longitudinal movement. On one end of the shaft 4 is mounted a pulley 7, adapted to receive power from any suitable source and to transmit the same to said shaft 4, and thence to the buffing wheel or wheels 8, which are detachably secured by means of collars 9 and nut 10, to the opposite end of the shaft 4. In the present instance the buffing wheel 8 is formed of suitable yielding fabric or material, the body of which consists of a suitable abrasive, adapted to produce a high polish on the articles desired.

11 designates a counter-shaft suitably mounted for rotation in the present instance at the lower portion of the frame 1, and carrying on one end a pulley 12, and on the other end a pinion 13, both said pulley and pinion being keyed or otherwise secured to the shaft 11 in order to rotate in unison therewith. The pulley 12 receives power from any suitable source and transmits the same to the pinion 13, which latter is in mesh with the gear 14 of a table 15, which, in the present instance, revolves in a vertical plane, whereby said table receives a rotary motion adapted to vary the relation of certain parts, presently to be described, with respect to the buffing wheel 8. This table 15 revolves in a plane at an angle as a right angle to the sleeve 3 and is provided with a hub 16 having lateral extensions 17 in order to form a suitable bearing surface on the sleeve 3 upon which it is mounted and which is driven by said table 15 through the medium of a key or spline 18 as will be obvious from Fig. 1. It will thus be apparent that the table 15 is provided with a bearing surface of some considerable length since the sleeve 3 serves to distribute the strain and wear to the bearings 2 and the main frame 1.

Referring now to the mechanism for receiving the articles to be polished and delivering the same to the devices for carrying them into engagement with the buffing wheel, 19 designates a receiving chuck secured for rotation with the table 15 by means of a key 20 in the extension 17 of the hub 16. The construction of this chuck 19 will be apparent by reference to Figs. 1, 4, and 5, where it will be seen in the present instance that a plurality of openings or notches 21 are provided at suitable intervals about the periphery of the chuck 19, in conjunction with each of which are a pair of angularly disposed grooves 22 terminating at one end at an edge of the notch 21 and diverging with respect to each other in order to form guideways for jaw members 23. These jaw members 23 are suitably secured to a tongue 24 formed for dove-tail engagement with each of the grooves 22 and it will be apparent that movement of the jaw members in the same direction within the guide-ways or grooves 22 will cause each pair of jaws to converge and grip an article or the like positioned between them. In the present instance, the jaws 23 are adapted to be adjustably mounted in the grooves 22, being provided for this purpose with a thumb screw 25 and a bridge plate 26 or like fastening device. Thus, in operation, the jaws are moved manually until they are positioned with respect to each other so that an article dropped between them will be held temporarily from displacement, and then they are set in this position by the fastening devices 25. These jaws 23 constitute the receiving mechanism for the articles to be polished and each pair is brought successively into alinement with the article to be buffed as 168, contained in the conveyer or feed chute 27 of any suitable type or construction. (See top of Fig. 1.) The means for delivering the article from this receiving device to the devices for bringing the articles into contact with the buffing wheel, consist in the present instance of a pusher plate 28 having a flared portion 29 (see Fig. 4) adapted to form a suitable surface for engaging the article to be removed. This pusher plate 28 is preferably secured to a stem 30, connected adjacent one end to a stud 31, carrying the cam roller 32, the function of which is to reciprocate the pusher plate at predetermined intervals, so that the latter will operate in the desired manner. In order to retain the stem 30 in place and permit the desired sliding movement therof, suitable lugs 33 are secured to the chuck 19 as will be clear from Fig. 5. It will, however, be noted that the side faces 34, of the chuck 19, are beveled to conform to the angular position of the devices, which receive the articles from this chuck and thereby causes a correct alinement of the parts, as will be apparent. It will furthermore be noted that the notches 21 preferably extend from one side of the chuck to the other and provide the necessary bearing for each stem 30 and its adjuncts. In connection with Fig. 4 it will be noted that only one of the pusher plates 28 has been shown in its correct position, but it will be understood that each notch 21 is provided with a similar plate 28 and jaw members 23 and these members have simply been omitted in this figure as needless repetition.

The operation of the several pusher plates 28 is effected in the present instance by means of a cam member 36 (see Fig. 1), secured fast to the frame 1 of the machine by means of a bolt 37 or like fastening means, it being noted that in the present instance this bolt engages a block 38 interposed between the frame 1 and the cam member 36 in order to give the proper inclination to the latter member. The bolt 37 in the present instance passes through a slot 39 of the cam member 36, whereby the said member may be adjusted to vary the movement of the pusher plate 28. This cam member 36 is provided with a cam groove 40 into which the cam rollers 32 (see Figs. 1 and 2) engage at a certain point in the travel of the receiving chuck 19, and it will be understood that the cam face 40 is designed to give a reciprocatory motion to the pusher plates through the engagement of the cam rollers therewith, and that such motion takes place at the desired point in the sequence of operations.

The devices for carrying the article into contact with the buffing wheel comprise in the present instance a plurality of chucks 41, which, as will hereafter appear, are given a compound swinging or floating movement, as contradistinguished from chucks of the usual construction, which usually move in a straight line. Each of the floating chucks is similar to the other, hence a description of one will therefore suffice for all. Referring to Fig. 8 of the drawing, one of these chucks will be seen in section and comprises a casing 42, being in the present instance secured to or integral with a bracket or arm 43 by means of which the chuck and its adjuncts are supported from parts of the machine presently to be described. 44 designates a worm suitably mounted in the casing 42, and driven by means of the sprocket wheel 45, the latter receiving motion from a suitable moving part of the mechanism. This worm 44 is normally in mesh with a worm gear 46 secured by means of a key 47 to a tubular spindle 48, the latter being mounted at one end for rotation in a bushing 49 carried by the casing head 50, which is held in place by bolts 51 or similar fastening means. The other end of the spindle 48 is provided with grooves 52 in which are located pins 53 (see also Fig. 16), positioned within the grooves 54 of the chuck jaw arms 55, the said pins forming the fulcrums of the jaws and effecting proper movement thereof. The arms 55 in the present instance terminate at the chuck end in sockets 56 adapted to receive and hold the chuck 57, said chuck being locked in place by means of bolts 58. The opposite end of the arms 55 are preferably formed with tongues 59, which are outwardly curved as shown in Fig. 8, and terminate within the recessed portion 60 of the collar 61, also secured to the spindle 48 by means of the key 47, so that the parts may rotate in unison. Attention is directed to the substantially V shaped contour of the recess 60 since this performs the function of engaging the tongues 59 and causing the arms 55 to oscillate in the manner of a toggle member. It will further be noted that the collar 61 is provided with a hub 62 extending into engagement with the worm gear member 46 and to which it is secured by means of the pin 63. 64 designates a sleeve located between the casing 42 and the arms 55 and collar 61 and serving as a bearing for the outer side of the arms 55 which, as will be seen, are curved to permit proper rocking of the said arms, and it will further be noted that this sleeve 64 is fixedly secured to the collar 61 by pins or set screws 65 or the link. 66 designates a ball race adapted to receive the ball bearings or antifriction devices 67, which provides for free movement of the parts within the casing and reduces the friction to a minimum, as is evident. 68 designates a similar ball bearing structure adjacent the opposite end of the spindle 48 and to which it preferably has a threaded connection 69 (see also Fig. 15). This bearing member 68 is preferably held between a nut 70 and a flange collar 71, the latter acting as an abutment for the conical spring 72 which abuts at its other end in the seat 73 of the worm gear 46. This construction serves as an actuating means to shift the tubular sleeve 48 to the right as shown in Fig. 8 and thus bring the tongues 59 into operative engagement with the collar 61, and thus return the parts to normal position. The movement of the sleeve 48 from right to left is caused by the oscillation of the fingers 74, which are normally positioned in contact with the bearing member 68 and are carried by the rock-shaft 75, the latter being operated by suitable mechanism at the proper time, as will be apparent from Figs. 1, 8, 13, 14, and 15. 76 designates a plunger mounted for sliding movement within the tubular spindle 48 and normally projecting exterior of the casing 42 and adapted to be held in such position by means of the spring 77, the latter encircling the plunger rod 78 and bearing at one end against the shoulder 79 of the spindle 48. The plunger rod 78 preferably extends through the casing 42 and into the chuck member 57 where it terminates in a plate 80, which acts as a means to eject the article when the same is released from the chuck. It will, of course, be understood that the plunger rod 78 may terminate in various types of ejecting means conforming to the style of article which is carried by the chuck, and in Figs. 10 and 11 different embodiments of such ejecting means are shown and it is to be understood that my device is not to be limited to any precise form of ejecting plate or other ejecting means.

Referring now to Fig. 18, which shows the initial positions of the parts, 81 designates a bolt or the like passing through the casing 42 and serving as an attaching means for the links 82, which comprises one member of the chuck supporting mechanism. These links 82 are pivotally connected at 83 to the arms 84, having one end pivoted at 85 to the bracket 86, which is fixedly secured to the rotatable table 15. The opposite ends of the arms 84 terminate in a head 87 carrying the cam roller 88 by means of which the several parts are actuated and assume different positions owing to the engagement of the cam roller 88 with the cam surfaces 89 and 124. 90 designates links pivotally secured at one end to the pivot member 85 and at the opposite end terminating in a head 91 carrying the cam roller 92, while intermediate these ends it is secured by a pin 93 to the bracket 43. It will thus be apparent that each of the casings 42 carrying the article chucks and their adjuncts are swingingly mounted on a series of levers adapted to be swung about the point 85 as a pivot and shifted as desired by the cam rollers 88 and 92.

In order to actuate the rock-shaft 75, so that the chuck may be opened and closed automatically, I preferably provide a crank or arm 94, which is suitably keyed to the shaft 75, and adapted to be operated by means of the pivotally connected bar 95, the latter being secured by a pin 96 to the trip arm 97. This trip arm 97 is provided with a slot 98 within which the pin 85 is adapted to ride, while a second slot 99 operates in conjunction with a pin 100 fixedly secured to the arm 84, the two pins just described serving to limit the movement of the trip arm 97, and also properly guide the same.

101 and 102 designate respectively trip pins fixedly secured to a suitable part of the rotatable table 15 (best seen in Fig. 20) and located on opposite sides of the trip arm 97, the latter, of course, extending into the path of movement of the trip pins and by which it is operated to actuate the bar 95 and thus rock the shaft 75.

103 designates a spring secured at one end to the bar 95 and at its opposite end to the trip arm 97, thereby serving as a means to assist the spring 72 seen in Fig. 8 to return the parts to normal position after an automatic shifting of the same.

104 designates a spring secured at one end to one of the bars 95, (see Fig. 28), and at the opposite end to a ring or lug 105 attached to the hub 17 or other suitable part of the table 15, the function of the spring being to retain the parts in normal position as shown in Fig. 18, while, by reference to Fig. 28, a diagrammatic arrangement of the several springs will make the construction clear. 106 designates a rod secured at one end to the arm 84 at the opposite of side of pivot 85 from arm 82 (see Fig. 26), and having its other end threaded into a sleeve 107, bearing against which is a follower plate 108, which acts as an abutment for one end of a spring 109, encircling the rod 106 and bearing at its other end against a similar plate 110. 111 designates a sleeve threaded to the rod 106 intermediate its ends and having slidingly fitted thereon an internally threaded cap 112, carrying the tube 113, which incloses the spring 109 and acts as a casing therefor. The opposite end of the tube 113 is threaded into a cap 114, having an opening 115 therein to receive the sleeve 107 and attached to a hanger 116, supported by a pin 117 from the lug 118, which latter is secured to the hub 17 of the table 15. By this construction it will be apparent that the springs 104 serve to maintain the chucks and their supporting adjuncts in a certain position and return them to this position after a certain cycle of operation, while the spring 109 with the tubular member 113 form an equalizing means which takes up any shock or jar due to the return of the parts to normal position.

The actuation of each chuck member is accomplished in the present instance, by means of the cam elements suitably positioned with respect to the cam rollers 88 and 92, it being noted that in the present instance these cam elements are located on opposite sides of the table 15 and that the latter is provided with suitable apertures 119 through which the arm 84 and its roller 88 are adapted to project into the path of the cams 89 and 124. These cams 89 and 124, as will be seen by reference to Figs. 1 and 18, are fixedly secured to the frame 1 by means of bolts 120 or the like, and are of course operatively positioned with respect to the elements which they control. Thus as the table 15 is rotated, the cam rollers 88 successively engage the cams 89 and 124, the contours of which are such as to swing the chuck member about its pivot 85 and bring the article carried by it into contact with the buffing wheel 8.

121 designates an annular standard located adjacent the buffing wheel end of the machine and to which a series of cams 122, 123, and 125 are secured, as will be best understood from Fig. 2 and the diagrammatic view in Fig. 7. The cam 124 is supported by the frame or standards 182 and fastening devices 183. For purpose of clearness I have designated these cams respectively, the guide cam 122, raising and lowering cam 123, lateral movement cam 124, and elevating cam 125. The guide cam 122 is preferably mounted on the standard 121 for sliding movement relative thereto, whereby its position with respect to the cam rollers 92 may be suitably adjusted, and in order to provide for this movement, I have, in the present instance, provided a plate 126 fixedly secured by bolts 127 to the standard 121 and have dovetailed slots 128 therein, coöperating with which are similarly shaped lugs 129, formed integral with or secured to the cam 122. These lugs co-act with the slots 128 and movement or adjustment of the cam 122 is effected by means of a feed screw 130 suitably mounted in a fixed portion of the frame 1, and carrying thereon a bevel gear 131, with which meshes a similar gear 132, of the spindle 133, which is suitably mounted in brackets 134 on the main frame 1, and carries a hand wheel 135, the operation of which as will be apparent, effects sliding movement of the cam 122. The cam 123 is fixedly secured by bolts 136, or like fastening means, to the standard 121, and after proper adjustment is adapted to remain stationary and fixed. The elevating cam 125 is adjustable in a somewhat similar manner to the guide cam 122, as far as sliding movement is concerned, since the standard 121 is provided with dovetailed guide-ways 138 with which coöperate the lugs 139 of similar conformation which are secured to the plate 137. The plate 137 has screw-threaded engagement with a feed screw 140, rotatably mounted in a bracket 141 of the standard 121, and carries thereon a hand wheel 142, by means of which the desired adjustment is effected. The elevating cam 125 is pivotally secured by a pin 143, to the plate 137, thereby permitting the same to swing relative to the plate 137 within certain limits, which in the present instance, are determined by a slot 144 in the cam 125, and through which a locking bolt 145 of the standard 121 is adapted to pass and hold the parts in adjusted position.

From the above it will be apparent that the cam roller 88 is controlled in its movement entirely by the cams 89 and 124, while the cam roller 92 is actuated by its contact with the sequence of cams just described, as carried by the standard 121.

The means for rotating the several chucks 41 during a polishing operation will now be described, and for this purpose I have preferably provided an internal stationary gear 146, fixedly secured by bolts 147, to the frame 1, and preferably positioned in close proximity to the rotatable table 15. This latter carries, as shown in Fig. 1, a plurality of bosses or bearings, corresponding in number to the chucks in use, within each of which is rotatably mounted a stud 148 carrying a pinion 149 normally in mesh with the internal gear 146. This stud 148 also carries a bevel gear 150, in mesh with a similar gear 151, carried by the pivot pin 85, which latter also has a sprocket wheel 152 thereon, which transmits motion by means of a chain 153 to a similar sprocket 154, in the present instance, mounted on the pin 93. (See Figs. 1 and 26). Motion is transmitted from the sprocket 180, also mounted on the pin 93, and by means of a chain 155 to the sprocket 45 which has already been described, and the parts driven thereby, shown in Fig. 8. The construction of the ejector will be understood from Figs. 24, 25, 26 and 29.

In order to eject an article after a polishing operation, I preferably provide a pair of arms 156, (see Fig. 29), fixedly secured to the table 15 and carrying a rod 157, upon which is mounted, for oscillating movement, a trip finger 158 normally held in operative position by means of a torsion spring 159 carried by the rod 157 and engaging at one end a pin 160 projecting from the said finger 158.

161 designates a lug or pin carried by the finger 158 and laterally projecting therefrom, to have a normal position in the path of movement of a trip lug 162 carried by the frame supporting the chuck members 41. The finger 158 is normally in the path of the plunger 76, which, it will be remembered, controls the operation of the ejecting device 80, and therefore as the chuck frame is lowered completing a polishing operation, the plunger 76 at the proper period engages the trip finger 158, as shown in Fig. 26, and is forced inwardly or toward or against the article in the chuck, thus effecting an ejecting action. After this is completed, further lowering of the chuck frame brings the trip lug 162 into contact with the pin 161 and partially rotates the said finger 158 against the tension of spring 159, and also a sufficient distance to remove it from engagement with the plunger 76.

It will of course be understood that at certain times both cam rollers 88 and 92 of a particular chuck unit are entirely disengaged from any of the controlling cams and therefore, unless some means are provided, to limit the return movement of the chuck frame due to the spring structure shown in Fig. 28, it would be swung out of position, and operation of the parts become impossible. To overcome such a contingency, I have preferably provided a stop 163 suitably secured to or carried by the table 15 and comprising a threaded member having a lock nut 164 thereon, whereby the stop may be adjusted at will and then locked in its proper adjusted position. As here shown, this stop 163 is located in the path of movement of the arms 90 of the chuck frame and its purpose and function will be clearly understood from Figs. 18 and 19.

It will be understood that in view of the multiplicity of parts and movements, it has been necessary to show the different elements in the various positions they assume, in detached separate views and that it has been necessary for the sake of clearness of illustration to omit from numerous views certain elements, which appear in other of said views.

It will be apparent that my invention is capable of a wide variety of uses, since, by varying the style or type of chuck, articles of varying shape or contour, can be presented to the buffing wheel. In Figs. 8, 9, and 11 I have shown the chuck members 57, as of the expanding type and adapted to open outwardly and thus retain in position the article to be buffed, as 165 or 166, by frictional contact with the internal side walls of said article, the article or cap 166 being of lesser diameter than the cap 165. In Fig. 10, I have shown the chuck jaws, 167, as adapted to move inwardly to grip the article 168, which may be a cap for a salt or pepper box, it being necessary in each instance to only make a slight change in the construction of the end of the ejector, as will be understood by those skilled in the art from Figs. 8, 10, and 11.

Figure 23:
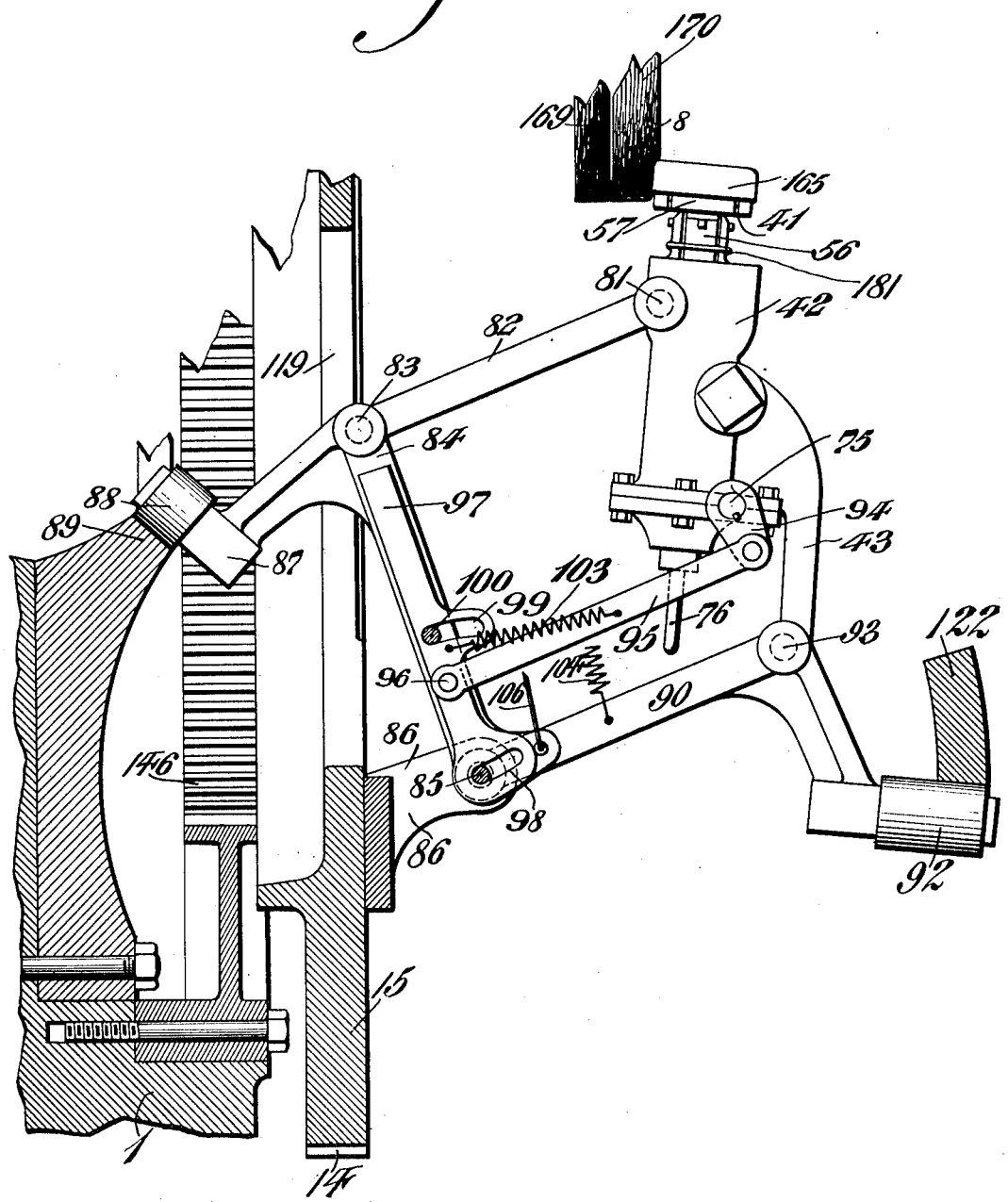
Figure 24:
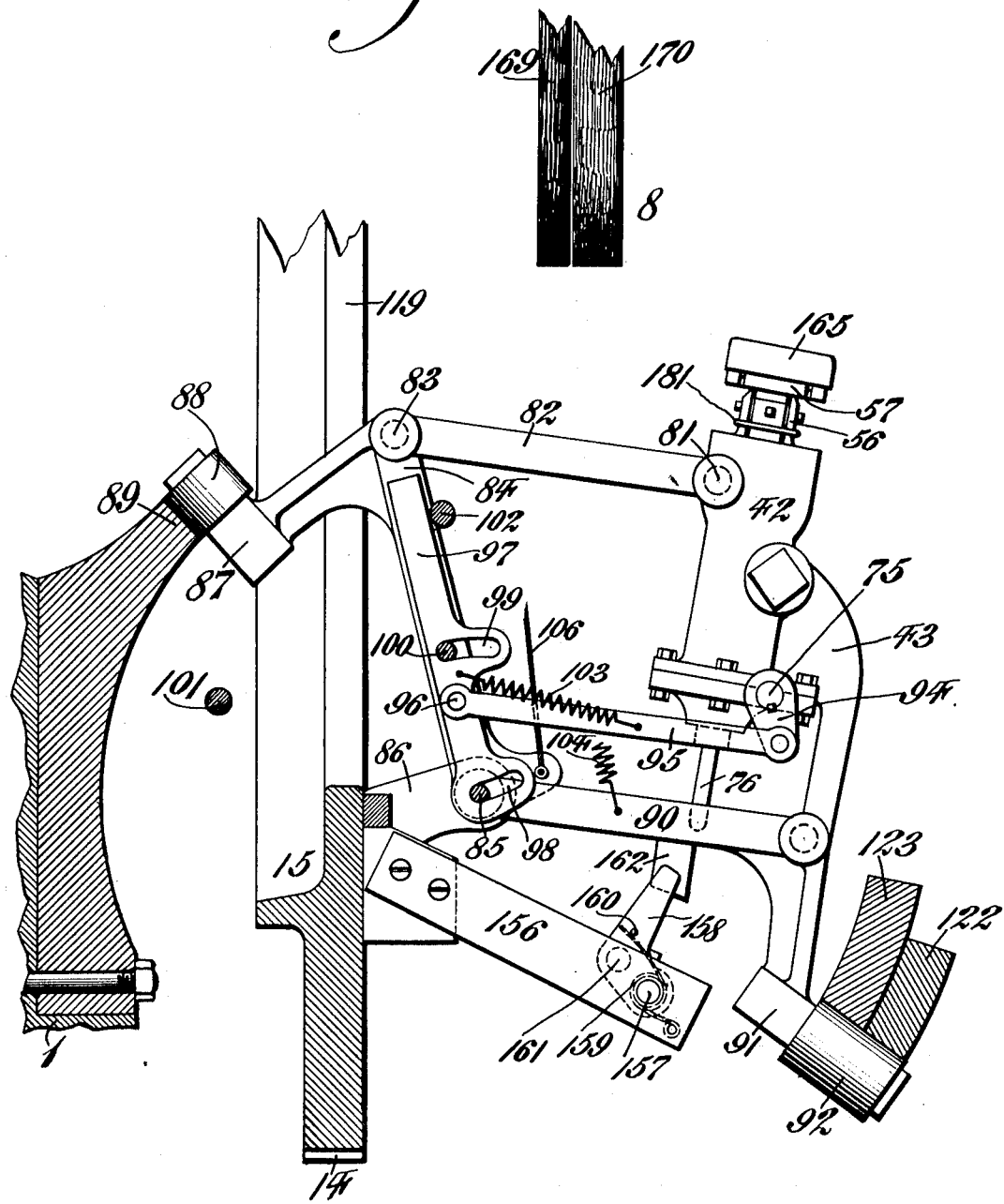

The operation is as follows:—The articles to be buffed are fed into the chute or conveyer, 27, and initially assume the position seen at the top of Fig. 1. Power having been applied to the pulley 7, the main shaft 4, and the buffing wheel or wheels 8, will be caused to revolve at the requisite rate of speed. Power having been applied to the pulley 12, will cause the pinion 13, seen at the bottom of Fig. 1, to rotate the table 15, and the sleeve 3, as the table 15 rotates, the rollers 88 and 92 by their contact with their co-acting cams will cause the proper movements to be imparted to their co-acting mechanism, and the engagement of the pinion 149 (rotating in unison with the table 15), with the stationary internal gear 146, will effect the proper actuation of the sprocket chains 153, and 155, whereby the rotation of the gear 45, worm 44, and their adjuncts, is effected. The actuation of the rock-shaft 75, and its finger 74 (see Fig. 8), which automatically opens and closes the chuck, is effected at the proper intervals by the connection of the bar 95 to the arm 94, said bar being operated at the proper intervals by the tripping mechanism seen in Fig. 18, it being understood that when the parts are in the position seen at the top of Fig. 1, the chuck 41 is about to advance into the cap 168, and to be expanded to engage the same. To follow a complete cycle of the operation of the cams, chucks, and their adjuncts, reference will be had first to Fig. 18, wherein the cap or other article as 165 is shown as being engaged by its chuck 41 and the roller 88, is in contact with its cam, 89. The rotation of the table 15 in conjunction with the movement caused by the contact of the roller 88 with its cam, will impart a dual movement to the article 165, which will travel from the position seen in Fig. 18, the first position, to the second position seen in Fig. 19. The article 165, being rotated by the connections already described, first has its side walls presented to the buffing wheel 8. The continued rotation of the table 15 and the contact of the rollers 88 and 92 with their cams, causes the article 165 to continue its movement from its second position, seen in Fig. 19, to its third position seen in Fig. 21, wherein the article 165 having had its side wall buffed is in the act of descending or moving downwardly with respect to the buffer 8. The fourth position the cap 165 assumes is shown in Fig. 1, the cap 165 now standing about vertical and having its top buffed. The continued rotation of the rollers and cams already referred to, carries the cap into its fifth position seen in Fig. 22. The sixth position is shown in Fig. 23, where the buffing is nearly completed, and the seventh position is shown in Fig. 24, wherein the plunger 76 of the ejector device, is shown as moving toward the finger 158. The eighth position is shown in Fig. 25, wherein the ejector plunger 76, and its co-acting finger 158 are shown in contact, the ejector plate having forced the finished buffed article from the chuck. The ninth position which the various levers and elements assume is shown in Fig. 26. The various positions which the rollers 88 and 92 assume with respect to their respective cams when the parts move from their first to ninth position, as explained with reference to Figs. 18, 19, 21, 1, 22, 23, 24, 25 and 26, will be readily understood by a reference to Fig. 2, and the diagrammatic view seen in Fig. 7. It will thus be seen that in the operation of my device, the chucks automatically are caused to assume three main or principal positions with respect to the buffing wheel, the first position broadly being an inclined position with respect to the inner edge of the buffing wheel, the next being broadly a vertical position against the bottom of said wheel and the last being an inclined position with respect to the outer edge of the buffing wheel.

In practice, I may make the buffing wheel of two members 169 and 170, the inner member being of coarser material than the outer or finishing member 170, although, it will of course be evident that both said wheel members 169 and 170 may be of the same grade of material, if desired.

The operation of the lever mechanism with respect to the chuck casing 42 and its adjuncts, and the actuation of the trip mechanism, will now be described in detail.

When an article 165, to be buffed, is to be placed in the chuck 57, the casing 42 and its adjuncts are in the positions seen in Fig. 18. It will be seen on referring to Fig. 18 that the trip arm 97 is in contact with the trip pin 101 and that the free or outer portion of the arm 84 is brought beyond said arm 97, (see Figs. 18 and 19). This relative movement of the arms 84 and 97 is effected by the rotation of the table 15 which carries the rollers 88 along the cam 124. When the arm 97 is brought to a stop by the trip pin 101 and the arm 84 continues to turn on the pin 85 as a center, the arm 97 is caused to turn on the pin 100 as a center, instead of on the pin 85, whereupon a pull is exerted on the bar 95. This imparts a rocking motion to the crank arm 94 and thus turns the rock-shaft 75, causing the fingers 74 to oscillate so as to impart a forward movement to the spindle 48, which, by reason of the pins 53, transmits this motion to the chuck jaw arms 55 (see Fig. 8). The forward movement of the arms 55 causes their tongues 59 to move out of the recesses 60 in the collar 61 whereupon the resilient ring 181 that encircles the chuck jaw arms 55 contracts and thus draws the chuck members 57 toward each other whereupon a cap or other article 165 to be buffed may readily be placed upon said chuck members 57. When the arm 97, seen in Fig. 18, is removed from its contact with the trip pin 101, as will be understood from Fig. 19, a pull is exerted on the bar 95 by reason of rearward movement of the spindle 48, seen in Fig. 8 and, which is effected by the expansion of the spring 72. This rearward movement of the spindle 48 causes the tongues 59 to enter the recesses 60 in the collar 61 so as to open out or expand the chuck members 57, so that the latter may firmly grip an article 165 and retain the same thereon during the buffing operation. When the buffing operation is completed, the trip arm 97, seen in Fig. 25, is in contact with the trip pin 102, and the arm 84 is carried beyond said arm 97 by the revolving table 15, cam 123 and the roller 92. When the relative positions of the arms 84 and 97 are as seen in Fig. 25, said arm 97 is turning on the pin 85 as a center, and exerts a pull on the bar 95 thereby rocking the crank arm 94, thus drawing the chuck members 57 toward each other as hereinbefore described, whereupon the article 165 may readily be removed from the chuck.

It will now be apparent that I have devised a novel and useful construction of a buffing machine, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. In a device of the character stated, a buffing-wheel, a carrier supported to rotate concentrically with such wheel, a chuck movably supported in said carrier, and means for successively and automatically moving such chuck against one face of the wheel, against the periphery of the same and against its opposite face.

2. In a device of the character stated, a buffing-wheel, a continuous carrier-support journaled to travel concentrically with said wheel, a series of chucks movably supported upon said carrier, and means for successively and automatically moving each of such chucks against one face of the wheel, against the periphery of the same and against its opposite face.

3. In a device of the character stated, a single buffing wheel, a rotary table, a floating chuck carried thereby, a plurality of cams located on opposite sides of said chuck and connections common to said cams and chuck for actuating the latter and to successively present the same against the inner, peripheral and outer portions of the buffing-wheel.

4. In a device of the character stated, a buffing wheel, a plurality of cams located on opposite sides of said wheel, a floating chuck casing, a chuck in said casing, connections common to said cams and chuck for operating the latter, and means for rotating said chuck.

5. In a device of the character stated, a buffing wheel, a chuck casing, chuck jaws therein, a plurality of cams located on opposite sides of said chuck casing, connections from said cams to said chuck casing for actuating the latter, and tripping mechanism for actuating said jaws.

6. In a device of the character stated, a buffing wheel, a chuck casing, chuck jaws therein, a plurality of cams located on opposite sides of said chuck casing, connections from said cams to said chuck casing for actuating the latter, and tripping mechanism for actuating said jaws, in combination with means for rotating said chuck jaws during the movement around said buffing wheel.

7. In a device of the character stated, a buffing wheel, a chuck, means for carrying articles to said chuck, means for causing said chuck to travel around said buffing wheel, so as to present the sides and top of said article to said wheel and means for ejecting said article from said chuck after buffing.

8. In a device of the character stated, a buffing wheel, a rotary table, a chuck casing carried thereby, a chuck in said casing, means for imparting a floating movement to said chuck casing around said wheel, and means for rotating said chuck during its travel around said wheel.

9. In a device of the character stated, a single buffing wheel, a chuck casing suitably supported, a chuck therein, means for causing said chuck to move in an inclined position toward the inner edge of said wheel, means for thereupon causing said chuck to descend and be positioned upright against the periphery of said wheel, and means for subsequently moving said chuck from said upright position to an inclined position against the outer edge of said wheel.

10. In a device of the character stated, a buffing wheel, a chuck casing suitably supported, a chuck therein, means for causing said chuck to move in an inclined position toward the inner edge of said wheel, means for causing said chuck to descend and be positioned upright against the periphery of said wheel, and means for moving said chuck from said upright position to an inclined position against the outer edge of said wheel, in combination with means for rotating said chuck during said movements.

11. In a device of the character stated, a two-piece buffing wheel composed of coarse and fine grades of material respectively, a chuck casing, a support therefor, a chuck in said casing, and means for causing said chuck to be automatically moved to successively present against the coarser, the peripheral, and the finer portions of said buffing wheel.

12. In a device of the character stated, a two-piece buffing wheel composed of finer and coarser portions, a chuck casing, a support therefor, a chuck in said casing to be moved automatically against the coarser, peripheral, and finer portions of said wheel, and means for rotating said chuck during its movement toward and away from said buffing wheel.

13. In a device of the character stated, a two-piece buffing wheel, a main shaft therefor, a sleeve surrounding said main shaft, a table fast on said sleeve, an article receiving mechanism rotatable in unison with said table and sleeve, means for rotating said table, sleeve and article receiving mechanism, a chuck supported on said table, and means for actuating said chuck with respect to said buffing wheel.

14. In a device of the character stated, a buffing wheel, a main shaft therefor, a sleeve surrounding said main shaft, a table fast on said sleeve, an article receiving mechanism rotatable in unison with said table and sleeve, means for rotating said table, sleeve and article receiving mechanism, a chuck supported on said table, a casing for said chuck, means for rotating said chuck, and means for moving said chuck casing toward and away from said buffing wheel.

15. In a device of the character stated, a main shaft suitably supported, a buffing wheel mounted thereon, a sleeve surrounding said main shaft, a table fast on said sleeve and rotatable in unison therewith, an article receiving mechanism rotatable in unison with said table and sleeve, means for rotating said table, sleeve and article receiving mechanism, a chuck casing supported on said table, a chuck in said casing, means for opening and closing the jaws of said chuck, means for rotating said chuck, cams located on each side of said chuck casing, and connections intermediate said cams and chuck casing for actuating the latter toward and away from said buffing wheel.

16. In a device of the character stated, a main shaft suitably supported, a buffing wheel mounted thereon, a sleeve surrounding said main shaft, a table fast on said sleeve and rotatable in unison therewith, an article receiving mechanism mounted on an extension of said table and rotatable therewith, means for rotating said table, sleeve and article receiving mechanism independently of said main shaft and wheel, a chuck casing, a chuck rotatable therein, means for causing said chuck casing to move toward and away from said wheel, and means for rotating said chuck.

17. In a device of the character stated, an article receiving mechanism suitably supported, means for rotating the same, a series of V-shaped recesses in the periphery of said article receiving mechanism, a series of grooves extending at an angle to each other and terminating in said V-shaped recesses, adjustable devices located in said grooves, and means for locking said adjustable devices in desired position.

18. In a device of the character stated, a buffing wheel, a chuck casing, chuck jaws operatively mounted therein, a mechanism for positioning said chuck casing in operative proximity to said buffing wheel, an article delivering device adjacent the path of movement of said chuck casing and means to actuate said chuck jaws to remove an article from said delivering device.

19. In a device of the character stated, a buffing wheel, a chuck casing, chuck jaws operatively mounted therein, a mechanism for positioning said chuck casing in operative proximity to said buffing wheel, an article receiving and delivering device adjacent the path of movement of said chuck casing, means to actuate said chuck jaws to remove an article from said delivering device, and means to actuate said chuck jaws simultaneously with the delivery of an article from said delivering device.

20. In a device of the character stated, a buffing wheel, a chuck casing, chuck jaws operatively mounted therein, a mechanism for positioning said chuck casing in operative proximity to said buffing wheel, an article delivering device adjacent the path of movement of said casing, actuating means for said chuck jaws, a trip operatively connected to said actuating means, and means to shift said trip to operate said jaws to grip an article delivered from said delivering device.

21. In a device of the character stated, a buffing wheel, a chuck casing, chuck jaws operatively mounted therein, a mechanism for positioning said chuck casing in operative proximity to said buffing wheel, an article delivering device adjacent the path of movement of said casing, actuating means for said chuck jaws, a trip operatively connected to said actuating means, means to shift said trip to operate said jaws to grip an article delivered from said delivering device, and means to return said trip to normal position.

22. In a device of the character stated, a buffing wheel, a chuck casing, chuck jaws operatively mounted therein, a mechanism for positioning said chuck casing in operative proximity to said buffing wheel, an artice delivering device adjacent the path of movement of said casing, actuating means for said chuck, a trip operatively connected to said actuating means, means to shift said trip to operate said jaws to grip an article delivered from said delivering device, means to limit the movement of said trip, and means to return said trip to normal position.

23. In a device of the character stated, a buffing wheel, a chuck casing, a floating support for said casing, chuck jaws operatively mounted in said casing, a mechanism for shifting said support to bring said chuck casing into operative proximity to said buffing wheel, an article delivering device adjacent the path of movement of said casing, actuating means for said chuck jaws, a trip pivotally mounted on said floating support for movement therewith and operatively connected to said actuating means, and means to shift said trip relative to said support, whereby said jaws are operated to grip an article delivered from said delivering device.

24. In a device of the character stated, a buffing wheel, a plurality of chuck casings, chuck jaws operatively mounted in each casing, a mechanism for positioning said chuck casings in operative proximity to said buffing wheel, an article delivering device adjacent the path of movement of said casings, and means to successively actuate the jaws of each chuck casing to grip the article delivered from said delivering device.

25. In a device of the character stated, a buffing wheel, a plurality of chuck casings, chuck jaws operatively mounted in each casing, a mechanism for positioning said chuck casings in operative proximity to said buffing wheel, an article delivering device located adjacent the path of movement of said casings and adapted to successively deliver suitable articles, and means to actuate the jaws of one of said casings simultaneously with the delivery of an article from said delivering device.

26. In a device of the character stated, a buffing wheel, a plurality of chuck casings, chuck jaws operatively mounted in each casing, a mechanism for positioning said chuck casings in operative proximity to said buffing wheel, an article delivering device adjacent the path of movement of said casings, actuating means for the respective chuck jaws, a trip suitably mounted adjacent each chuck casing and operatively connected to said actuating means, and means to shift one of said trips to operate the chuck jaws controlled thereby, to grip an article delivered from said delivering device.

27. In a device of the character stated, a buffing wheel, a plurality of chuck casings, chuck jaws operatively mounted in each casing, a mechanism for positioning said chuck casings in operative proximity to said buffing wheel, an article delivering device adjacent the path of movement of said casings, actuating means for the respective chuck jaws, a trip suitably mounted adjacent each chuck casing and operatively connected to said actuating means, means to shift one of said trips to operate the chuck jaws controlled thereby to grip an article delivered from said delivering device, and means to return said trip to normal position.

28. In a device of the character stated, a buffing wheel, a plurality of chuck casings, chuck jaws operatively mounted in each casing, a mechanism for positioning said chuck casings in operative proximity to said buffing wheel, an article delivering device adjacent the path of movement of said casings, actuating means for said chuck jaws, a trip suitably mounted adjacent each chuck casing and operatively connected to said actuating means, and means to successively operate said trips to operate said jaw actuating means whereby an article is gripped by said jaws.

29. In a device of the character stated, a buffing wheel, a chuck casing, chuck jaws operatively mounted therein, a mechanism for positioning said chuck casing in operative proximity to said buffing wheel, an article ejecting device adapted to eject an article from said casing at a predetermined time, and means to actuate said chuck jaws to release said article from removal by said ejecting device.

30. In a device of the character stated, a buffing wheel, a chuck casing, chuck jaws operatively mounted therein, a mechanism for positioning said chuck casing in operative proximity to said buffing wheel, an ejecting device slidingly mounted in said casing and having a portion thereof projecting exterior of said casing, means located in the path of movement of said ejecting device for operating the same at a predetermined time, and means to actuate said chuck jaws to release an article for removal by said ejecting device.

31. In a device of the character stated, a buffing wheel, a chuck casing, chuck jaws operatively mounted therein, a mechanism for positioning said chuck casing in operative proximity to said buffing wheel, an ejecting device slidingly mounted in said casing, and having a portion projecting exterior thereof, a trip normally positioned in the path of movement of said ejecting device, means to actuate said chuck jaws to release an article for removal by said ejecting device, and means to shift said trip from engagement with said ejecting device.

32. In a device of the character stated, a buffing wheel, a chuck casing, chuck jaws operatively mounted therein, a mechanism for positioning said chuck casing in operative proximity to said buffing wheel, an article ejecting device slidingly mounted in said casing and having a portion projecting exterior thereof, a trip normally held in the path of movement of said ejecting device, actuating means for said chuck jaws, a second trip operatively connected to said actuating means, and means to shift said latter trip to operate said jaws to release an article for removal by said ejecting device.

33. In a device of the character stated, a buffing wheel, a chuck casing, chuck jaws operatively mounted therein, a mechanism for positioning said chuck casing in operative proximity to said buffing wheel, an article ejecting device slidingly mounted in said casing and having a portion projecting exterior thereof, a trip normally held in the path of movement of said ejecting device, actuating means for said chuck jaws, a second trip operatively connected to said actuating means, means to shift said latter trip to operate said jaws to release an article for removal by said ejecting device, and means to shift said ejector trip out of the path of said ejecting device.

34. In a device of the character stated, a buffing wheel, a plurality of chuck casings, chuck jaws operatively mounted in each casing, a mechanism for successively positioning said chuck casings in operative proximity to said buffing wheel, an article ejecting device adapted to eject an article from said casing, and means to successively actuate said chuck jaws to release said article for removal by said ejecting device.

35. In a device of the character stated, a buffing wheel, a plurality of chuck casings, chuck jaws operatively mounted in each casing, a mechanism for successively positioning said chuck casings in operative proximity to said buffing wheel, an article ejecting device slidingly mounted in each casing and having a portion projecting exterior thereof, means to successively operate said ejecting devices at a predetermined time, and means to successively actuate said chuck jaws to release an article for removal by said ejecting device.

36. In a device of the character stated, a buffing wheel, a plurality of chuck casings, chuck jaws operatively mounted in each casing, a mechanism for successively positioning said chuck casings in operative proximity to said buffing wheel, an article ejecting device carried by each casing, means located at a predetermined point with respect to the travel of said casings, and positioned in the path of movement of all of said ejecting devices, for successively operating said ejecting devices, and means to successively actuate said chuck jaws to release said articles for removal by said ejecting devices.

37. In a device of the character stated, a buffing wheel, a chuck casing, a support therefor, a chuck in said casing, a guide cam for causing said chuck to be moved against the inner portion of said wheel, a raising and lowering cam for causing said chuck to be reciprocated against the inner portion of said wheel, a lateral movement cam for causing said chuck to be moved against the peripheral portion of said wheel, an elevating cam for causing said chuck to be moved against the outer portion of said wheel, said cam being suitably supported adjacent said chuck casing, and connections common to said cam and chuck for actuating the latter.

38. In a device of the character stated, a buffing wheel, a chuck casing, a support therefor, a chuck in said casing, a guide cam adjustably mounted in the path of movement of said support, for causing said chuck to be moved against the inner portion of said wheel, means for causing said chuck to be moved automatically against the peripheral and outer portions of said wheel, and connections common to said cam and chuck for actuating the latter.

39. In a device of the character stated, a buffing wheel, a chuck casing, a support therefor, a chuck in said casing, a guide cam adjustably mounted in the path of movement of said support, a raising and lowering cam for causing said chuck to be reciprocated against the inner portion of said wheel, means for causing said chuck to be moved automatically against the peripheral and outer portions of said wheel, and connections common to said cam and chuck for actuating the latter.

40. In a device of the character stated, a buffing wheel, a chuck casing, a support therefor, a chuck in said casing, a guide cam for causing said chuck to be moved against the inner portion of said wheel, a raising and lowering cam for causing said chuck to be reciprocated against the inner portion of said wheel, a lateral movement cam for causing said chuck to be moved against the peripheral portion of said wheel, said cams being suitably mounted adjacent said casing, means adjustably mounted for causing said chuck to be moved automatically against the outer portion of said wheel and connections common to said cams and chuck for actuating the latter.

41. In a device of the character stated, a buffing wheel, a chuck casing, a support therefor, a chuck in said casing, a guide cam for causing said chuck to be moved against the inner portion of said wheel, a raising and lowering cam for causing said chuck to be reciprocated against the inner portion of said wheel, a lateral movement cam for causing said chuck to be moved against the peripheral portion of said wheel, an elevating cam for causing said chuck to be moved against the outer portion of said wheel, said cams being suitably supported adjacent said casing, and connections common to said cam and chuck for actuating the latter, in combination with means for rotating said chuck during its movement.

42. In a device of the character stated, a buffing wheel, a chuck casing, a support therefor, a chuck in said casing, a guide cam adjustably mounted in the path of movement of said support for causing said chuck to be moved against the inner portion of said wheel, means for causing said chuck to be moved automatically against the peripheral and outer portions of said wheel, and connections common to said cam and chuck for actuating the latter, in combination with means for rotating said chuck during its movement.

43. In a device of the character stated, a buffing wheel, a chuck casing, a support therefor, a chuck in said casing, a guide cam adjustably mounted in the path of movement of said support, a raising and lowering cam for causing said chuck to be reciprocated against the inner portion of said wheel, means for causing said chuck to be moved automatically against the peripheral and outer portions of said wheel, and connections common to said cam and chuck for actuating the latter, in combination with means for rotating said chuck during its movement.

44. In a device of the character stated, a buffing wheel, a chuck casing, a support therefor, a chuck in said casing, a guide cam for causing said chuck to be moved against the inner portion of said wheel, a raising and lowering cam for causing said chuck to be reciprocated against the inner portion of said wheel, a lateral movement cam for causing said chuck to be moved against the peripheral portion of said wheel, said cams being suitably mounted adjacent said casing, means adjustably mounted for causing said chuck to be moved automatically against the outer portion of said wheel, and connections common to said cams and chuck for actuating the latter, in combination with means for rotating said chuck during its movement.

45. In a device of the character stated, a buffing wheel, a chuck casing, a support therefor, a chuck in said casing, means for causing said chuck to be moved automatically into operative engagement with said wheel, spring means for returning said chuck to normal position, an equalizing device operating in conjunction with said spring means, and means determining the normal position of said chuck.

46. In a device of the character stated, a buffing wheel, a main shaft therefor, a table rotatably mounted on said shaft, a plurality of chuck casings, a support for each chuck casing pivotally mounted on said table, means for causing each chuck casing to be moved automatically into operative engagement with said buffing wheel, spring means between each chuck support and said table for returning said chuck to normal position, an equalizing device between each chuck support and said table, and means determining the normal position of each chuck casing.

47. In a device of the character stated, a buffing wheel, a plurality of chuck casings, a support for each casing, a chuck in each casing, and means for successively causing each chuck to be moved automatically against the inner, peripheral and outer portions of said wheel.

48. In a device of the character stated, a two piece buffing wheel, composed of coarse and fine material, a chuck casing, a chuck in said casing, means for rotating said chuck, and means for carrying said chuck automatically in an approximately concentric path about said buffing wheel, and for simultaneously moving said chuck automatically toward the inner coarse portion of said buffing wheel, next against the peripheral portion and lastly against the outer, finer portion of said wheel.

49. In a device of the character stated, a revolving buffing-wheel, a chuck, and means for moving one of said elements in its relation to the other to successively present the side of the article to one face of the wheel, the top of the article to the periphery of the same, and the side of the article to the opposite side of the wheel.

50. In a device of the character stated, a revolving buffing-wheel, a movably supported chuck, and means for moving said chuck to successively present the side of the article to one face of the wheel, the top of the article to the periphery of the same, and the side of the article to the opposite side of the wheel.

51. In a device of the character stated, a revolving buffing-wheel, a movably supported chuck, means for moving said chuck to successively present the side of the article to one face of the wheel, the top of the article to the periphery of the same, and the side of the article to the opposite side of the wheel, and means for revolving said chuck.

52. In a device of the character stated, a single buffing-wheel, a plurality of chucks, means for supporting said chucks, means for successively presenting each of said chucks to said buffing-wheel, and means for successively moving each of said chucks against the inner, the peripheral and the outer portions of said wheel while so presented.

53. In a device of the character stated, a single buffing-wheel, a plurality of chucks, means for supporting said chucks, means for feeding the articles to said chucks, means for successively presenting such chucks to said feeding means and to said wheel, and means for successively moving each of said chucks against the inner, the peripheral and the outer portions of said wheel.

54. In a device of the character stated, a single buffing-wheel, a support concentrically rotatable with said wheel, chucks radially movable in said support, means for feeding the articles to said chucks, means for rotating said support to successively present each of said chucks to said feeding means, and means operatively connected to said support to successively present each of said chucks to the inner, the peripheral and the outer portions of said buffing-wheel.

EDWIN RUST DOUGLAS.

Witnesses:
E. HAYWARD FAIRBANKS,
C. D. McVAY.